US011703165B2

(12) United States Patent
Bearer et al.

(10) Patent No.: US 11,703,165 B2
(45) Date of Patent: Jul. 18, 2023

(54) FERRULE ASSEMBLY FOR CONDUIT FITTING

(71) Applicant: Swagelok Company, Solon, OH (US)

(72) Inventors: Mark D. Bearer, Akron, OH (US); Ronald P. Campbell, Shaker Heights, OH (US); Douglas J. McClure, Mentor, OH (US); Cal R. Brown, Lyndhurst, OH (US); Peter C. Williams, Cleveland Heights, OH (US); Douglas S. Welch, Chesterland, OH (US); Stephen J. Zaborszki, Northfield, OH (US); Richard J. Mlinarik, Mantua, OH (US); Robert A. Fotta, Burton, OH (US); Matthew K. Messer, Mentor, OH (US); Gregory S. Kalata, Avon, OH (US)

(73) Assignee: Swagelok Company, Solon, OH (US)

( * ) Notice: Subject to any disclaimer, the term of this patent is extended or adjusted under 35 U.S.C. 154(b) by 380 days.

(21) Appl. No.: 17/049,455

(22) PCT Filed: Apr. 25, 2019

(86) PCT No.: PCT/US2019/029031
§ 371 (c)(1),
(2) Date: Oct. 21, 2020

(87) PCT Pub. No.: WO2019/210016
PCT Pub. Date: Oct. 31, 2019

(65) Prior Publication Data
US 2021/0247005 A1 Aug. 12, 2021

Related U.S. Application Data

(60) Provisional application No. 62/663,430, filed on Apr. 27, 2018, provisional application No. 62/713,127, filed on Aug. 1, 2018.

(51) Int. Cl.
*F16L 19/10* (2006.01)

(52) U.S. Cl.
CPC ................. *F16L 19/103* (2013.01)

(58) Field of Classification Search
CPC ......... F16L 19/08; F16L 19/10; F16L 19/103; F16L 19/12
See application file for complete search history.

(56) References Cited

U.S. PATENT DOCUMENTS

| 1,548,533 A | 8/1925 | Laderer |
| 1,595,310 A | 8/1926 | Mueller et al. |

(Continued)

FOREIGN PATENT DOCUMENTS

| AU | 2006295825 | 4/2007 |
| CA | 2400675 | 9/2001 |

(Continued)

OTHER PUBLICATIONS

Office action and Search Report from Chinese Application No. 2019800352919 dated Feb. 23, 2022.

(Continued)

*Primary Examiner* — Aaron M Dunwoody
(74) *Attorney, Agent, or Firm* — Calfee, Halter & Griswold LLP

(57) ABSTRACT

A ferrule subassembly for a conduit fitting includes first and second ferrules. The first ferrule includes a front body portion defining a forward tapered surface, a rear body portion defining an interior camming surface, and a retaining extension joined with the rear body portion radially outward of the camming surface and extending axially rearward and radially inward from the inner axial portion. The second ferrule includes a front portion having a tapered forward contact surface adjacent the first ferrule camming surface, an outer radial portion extending axially rearward of the for- (Continued)

ward contact surface, and a recessed portion axially rearward of the outer radial portion. An end portion of the retaining extension is received in the recessed portion of the second ferrule to retain the second ferrule with the first ferrule as a discontinuous subassembly.

20 Claims, 9 Drawing Sheets

(56) References Cited

U.S. PATENT DOCUMENTS

| | | | |
|---|---|---|---|
| 1,672,879 A | 6/1928 | Campbell, Jr. |
| 1,772,536 A | 8/1930 | Cox |
| 1,809,064 A | 6/1931 | Pearson |
| 2,301,280 A | 11/1942 | Howe |
| 2,389,233 A | 11/1945 | Cowles |
| 2,497,273 A | 2/1950 | Richardson |
| 2,547,889 A | 4/1951 | Richardson |
| 2,943,871 A | 7/1960 | St. Clair |
| 3,004,776 A | 10/1961 | Sebardt |
| 3,074,747 A | 1/1963 | Boughton |
| 3,083,989 A | 4/1963 | Press |
| 3,103,373 A | 9/1963 | Lennon et al. |
| 3,201,153 A | 8/1965 | Currie |
| 3,215,457 A | 11/1965 | Teeters |
| 3,218,096 A | 11/1965 | Press |
| 3,219,367 A | 11/1965 | Franck |
| 3,250,550 A | 5/1966 | Lyon |
| 3,290,069 A | 12/1966 | Davis |
| 3,306,637 A | 2/1967 | Press et al. |
| 3,321,947 A | 5/1967 | Teeters |
| 3,325,192 A | 6/1967 | Sullivan |
| 3,433,508 A | 3/1969 | Teeters |
| 3,498,647 A | 3/1970 | Schroder |
| 3,582,115 A | 6/1971 | Clague |
| 3,695,640 A | 10/1972 | Clague |
| 3,707,302 A | 12/1972 | Hiszpanski |
| 3,834,742 A | 9/1974 | McPhillips |
| 3,866,958 A | 2/1975 | Gold |
| 3,893,716 A | 7/1975 | Moreiras |
| 3,907,335 A | 9/1975 | Burge |
| 3,972,547 A | 8/1976 | Itoya |
| 4,022,497 A | 5/1977 | Kotsakis |
| 4,076,286 A | 2/1978 | Spontelli |
| 4,136,597 A | 1/1979 | Haluch |
| 4,136,897 A | 1/1979 | Haluch |
| 4,309,050 A | 1/1982 | Legris |
| 4,328,980 A | 5/1982 | Normark |
| 4,500,117 A | 2/1985 | Ayers |
| 4,575,274 A | 3/1986 | Hayward |
| 4,592,574 A | 6/1986 | Vollmuth et al. |
| 4,805,932 A | 2/1989 | Imhof et al. |
| 5,028,078 A | 7/1991 | Schwarz et al. |
| 5,119,937 A | 1/1992 | Reynolds, Jr. |
| 5,351,998 A | 10/1994 | Behrens |
| 5,388,866 A | 2/1995 | Schlosser |
| 5,536,049 A | 7/1996 | Coules et al. |
| 5,586,910 A | 12/1996 | Del Negro et al. |
| 5,720,504 A | 2/1998 | Stedman et al. |
| 5,882,050 A | 3/1999 | Williams |
| 5,961,160 A | 10/1999 | Frohich |
| 6,073,976 A | 6/2000 | Schmidt et al. |
| 6,079,749 A | 6/2000 | Albino et al. |
| 6,131,963 A | 10/2000 | Williams et al. |
| 6,527,303 B2 | 3/2003 | Kariyama et al. |
| 6,629,708 B2 | 10/2003 | Williams |
| 6,905,142 B2 | 6/2005 | Do |
| 7,108,288 B2 | 9/2006 | Bennett et al. |
| 7,316,777 B2 | 1/2008 | Loy, Jr. |
| 7,374,212 B1 | 5/2008 | Gretz |
| 7,469,936 B2 | 12/2008 | Norman |
| 7,497,483 B2 | 3/2009 | Williams et al. |
| 7,690,693 B2 | 4/2010 | Moner |
| 7,695,027 B2 | 4/2010 | Williams et al. |
| 7,871,110 B2 | 1/2011 | Ostergaard et al. |
| 8,007,013 B2 | 8/2011 | Arstein |
| 8,616,586 B2 | 12/2013 | Ostergaard et al. |
| 8,641,099 B2 | 2/2014 | Cuva |
| 8,870,237 B2 | 10/2014 | Sindelar |
| 8,931,810 B2 | 1/2015 | Clason |
| 9,016,732 B2 | 4/2015 | Bearer |
| 9,267,627 B2 | 2/2016 | Bennett |
| 9,297,481 B2 | 3/2016 | Williams |
| 9,958,097 B2 | 5/2018 | Rubinski |
| 10,619,770 B2 | 4/2020 | Bennett |
| 2001/0054821 A1 | 12/2001 | Volcansek |
| 2002/0148128 A1 | 10/2002 | Williams |
| 2003/0025331 A1 | 2/2003 | Williams et al. |
| 2003/0197378 A1 | 10/2003 | Allstead et al. |
| 2005/0097763 A1 | 5/2005 | Williams |
| 2006/0006651 A1 | 1/2006 | Watanabe |
| 2006/0138772 A1 | 6/2006 | Galante et al. |
| 2006/0237962 A1 | 10/2006 | Anderson et al. |
| 2009/0045624 A1 | 2/2009 | Nakata et al. |
| 2010/0102554 A1 | 4/2010 | Xu |
| 2010/0148501 A1* | 6/2010 | Bennett ............... F16L 19/103 285/24 |
| 2011/0181042 A1 | 7/2011 | Clason et al. |
| 2011/0204618 A1 | 8/2011 | Bearer et al. |
| 2013/0106103 A1 | 5/2013 | Horsfall et al. |
| 2014/0232111 A1 | 8/2014 | Shimamura |
| 2014/0353969 A1 | 12/2014 | Shimamura |
| 2015/0167873 A1 | 6/2015 | Arstein |
| 2015/0323110 A1 | 11/2015 | Trivett |
| 2016/0195204 A1 | 7/2016 | Bennett et al. |
| 2016/0281892 A1 | 9/2016 | Arstein |
| 2017/0059065 A1 | 3/2017 | Williams |
| 2017/0227151 A1 | 8/2017 | Williams |
| 2017/0261137 A1 | 9/2017 | Williams |
| 2019/0040980 A1 | 2/2019 | Bearer |

FOREIGN PATENT DOCUMENTS

| | | |
|---|---|---|
| CA | 2357780 | 3/2002 |
| CN | 1113665 | 12/1995 |
| CN | 1969142 | 5/2007 |
| CN | 101018969 | 8/2007 |
| CN | 201053546 | 4/2008 |
| CN | 101305232 | 11/2008 |
| CN | 101415985 | 4/2009 |
| CN | 101617159 | 12/2009 |
| CN | 101802474 | 8/2010 |
| DE | 841091 | 6/1952 |
| DE | 4219722 | 12/1993 |
| DE | 19519016 | 11/1996 |
| DE | 19855795 | 6/2000 |
| DE | 10011146 | 9/2001 |
| DE | 19607784 | 8/2006 |
| DE | 60119154 | 2/2007 |
| EP | 523020 | 1/1993 |
| EP | 895014 | 2/1999 |
| EP | 1247039 | 10/2002 |
| EP | 1936250 | 6/2008 |
| EP | 1995504 | 11/2008 |
| EP | 2128509 | 12/2009 |
| ES | 2260295 | 11/2006 |
| FR | 2171506 | 9/1973 |
| FR | 2873184 | 1/2006 |
| GB | 704281 | 2/1954 |
| GB | 749395 | 5/1956 |
| GB | 1028663 | 5/1966 |
| GB | 1361372 | 7/1974 |
| GB | 2032555 | 5/1980 |
| GB | 2121133 | 12/1983 |
| JP | S57187985 | 11/1982 |
| JP | H0893975 | 4/1996 |
| JP | 11-030368 | 2/1999 |
| JP | H11-030368 | 2/1999 |
| JP | H11223286 | 8/1999 |
| JP | H11248075 | 9/1999 |
| JP | 2000110975 | 4/2000 |
| JP | 2003-232474 | 8/2003 |
| JP | 2005-337326 | 12/2005 |

(56) References Cited

FOREIGN PATENT DOCUMENTS

| | | |
|---|---|---|
| JP | 2007-146893 | 6/2007 |
| JP | 2007162741 | 6/2007 |
| JP | 2009085430 | 4/2009 |
| JP | 2009-097715 | 5/2009 |
| JP | 2010084880 | 4/2010 |
| JP | 2011106539 | 6/2011 |
| JP | 2012-225354 | 11/2012 |
| WO | 2001/066989 | 9/2001 |
| WO | 2002/057678 | 7/2002 |
| WO | 2005/106310 | 11/2005 |
| WO | 2006/018407 | 2/2006 |
| WO | 2006/084766 | 8/2006 |
| WO | 09/003015 | 12/2008 |
| WO | 2009/018079 | 2/2009 |
| WO | 2009/034948 | 3/2009 |
| WO | 2010/0278894 | 3/2010 |
| WO | 10/129261 | 11/2010 |

OTHER PUBLICATIONS

International Search Report and Written Opinion from PCDT/US2017/017099 dated May 8, 2017.
International Search Report and Written Opinion from PCT/US19/29031 dated Aug. 8, 2019.
International Search Report and Written Opinion from PCT/US09/67508 dated Mar. 8, 2010.

* cited by examiner

FERRULE ASSEMBLY FOR CONDUIT FITTING

CROSS-REFERENCE TO RELATED APPLICATIONS

This application claims priority to and all benefit of U.S. Provisional Patent Application Ser. No. 62/663,430, filed on Apr. 27, 2018 and entitled FERRULE ASSEMBLY FOR CONDUIT FITTING, and U.S. Provisional Patent Application Ser. No. 62/713,127, filed on Aug. 1, 2018 and entitled FERRULE ASSEMBLY FOR CONDUIT FITTING, the entire disclosures of both of which are incorporated herein by reference.

TECHNICAL FIELD OF THE INVENTIONS

The present disclosure relates to fittings for metal conduits such as metal tube and pipe. More particularly, the disclosure relates to fittings that provide conduit grip and seal by tightening together mating threaded fitting components. One example of a conduit fitting is a flareless fitting that uses one or more conduit gripping devices to establish conduit grip and seal.

BACKGROUND OF THE DISCLOSURE

Conduit fittings are used in gas or liquid fluid systems to provide a fluid tight mechanical connection between a conduit and another fluid flow device, such as another conduit, a flow control device such as a valve or regulator, a port and so on. A particular type of conduit fitting commonly used is known as a flareless fitting that uses one or more conduit gripping devices such as ferrules, for example, to provide the grip and seal functions. Such fittings are popular as they do not require much preparation of the conduit end, other than squaring off and de-burring. We use the term "fitting" herein as a shorthand reference to a conduit fitting, such as a tube or pipe fitting, for example.

A conventional ferrule type fitting is pulled-up by turns, meaning that the threadably mating fitting components are tightened together a specified number of relative turns and partial relative turns with respect to each other past a reference position. The reference position is often a finger tight position. By controlling the number of turns and partial turns past the finger tight position, the relative stroke or axial advance of the fitting components together may be controlled to assure that the ferrules effectively grip and seal the conduit. Oftentimes, such fittings are loosened for various repair and maintenance activities in the fluid system, and then the loosened fitting is re-tightened, commonly referred to as "remake" or "remaking" the fitting. Such remakes may be done with the same fitting components and ferrules, or sometimes one or more parts are replaced.

SUMMARY OF THE DISCLOSURE

According to an exemplary embodiment that is presented herein, a ferrule subassembly for a conduit fitting includes first and second ferrules. The first ferrule includes a front body portion defining a forward tapered surface, a rear body portion defining an interior camming surface, and a retaining extension joined with the rear body portion radially outward of the camming surface and extending axially rearward and radially inward from the inner axial portion. The second ferrule includes a front portion having a tapered forward contact surface adjacent the first ferrule camming surface, an outer radial portion extending axially rearward of the forward contact surface, and a recessed portion axially rearward of the outer radial portion. An end portion of the retaining extension is received in the recessed portion of the second ferrule to retain the second ferrule with the first ferrule as a discontinuous subassembly. Additional embodiments are disclosed herein.

According to another exemplary embodiment presented herein, a ferrule includes a front body portion defining a forward tapered surface, a rear body portion defining an interior camming surface, and a retaining extension including an inner axial portion positioned radially outward of the camming surface and extending axially rearward from the rear body portion, and an outer axial portion joined with the inner axial portion and extending axially rearward and radially inward from the inner axial portion. Additional embodiments are disclosed herein.

According to another exemplary embodiment presented herein, a method of cartridging first and second ferrules as a discontinuous preassembly is contemplated. In the exemplary method, a first ferrule is provided, having a retaining extension extending axially rearward and radially inward from a hinge portion joining the retaining extension to a rear body portion of the first ferrule. A second ferrule is aligned with the first ferrule along a common central axis. A tapered forward contact surface of the second ferrule is axially pressed against the retaining extension of the first ferrule, such that the retaining extension bends about the hinge portion in an axially rearward and radially outward direction to align an end portion of the retaining extension with a recessed portion axially rearward of the outer radial portion. The bending of the retaining extension about the hinge portion is at least partially elastic, such that when the end portion of the retaining extension is axially aligned with the recessed portion, the end portion snaps into the recessed portion of the second ferrule to secure the second ferrule with the first ferrule as a discontinuous preassembly. Additional embodiments are disclosed herein.

According to another exemplary embodiment presented herein, a conduit fitting includes a ferrule subassembly including first and second ferrules, a first fitting component, and a second fitting component joined to said first fitting component with said subassembly disposed between said first fitting component and said second fitting component. The first ferrule includes a front body portion defining a forward tapered surface, a rear body portion defining an interior camming surface, and a retaining extension joined with the rear body portion radially outward of the camming surface and extending axially rearward and radially inward from the inner axial portion. The second ferrule includes a front portion having a tapered forward contact surface adjacent the first ferrule camming surface, an outer radial portion extending axially rearward of the forward contact surface, and a recessed portion axially rearward of the outer radial portion. An end portion of the retaining extension is received in the recessed portion of the second ferrule to retain the second ferrule with the first ferrule as a discontinuous subassembly. Additional embodiments are disclosed herein.

These and other embodiments of various inventions disclosed herein will be understood by those skilled in the art in view of the accompanying drawings.

BRIEF DESCRIPTION OF THE DRAWINGS

Further advantages and benefits will become apparent to those skilled in the art after considering the following description and appended claims in conjunction with the accompanying drawings, in which:

DESCRIPTION OF THE EXEMPLARY EMBODIMENTS

Figure 1:
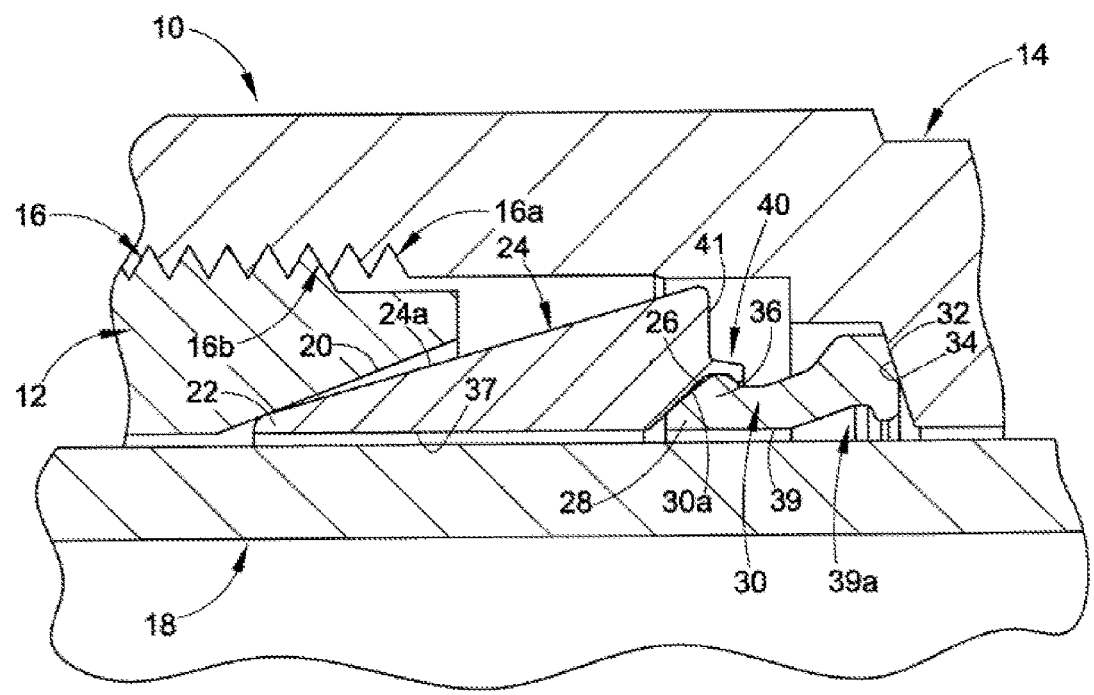
FIG. 1 illustrates a partial cross-sectional view of a conduit fitting having a known cartridged ferrule subassembly according to an exemplary embodiment.

Although the exemplary embodiments herein are presented in the context of a stainless steel tube fitting, the inventions herein are not limited to such applications, and will find use with many different metal conduits such as tube and pipe as well as different materials other than 316 stainless steel, and may also be used for liquid or gas fluids. Although the inventions herein are illustrated with respect to exemplary design of the conduit gripping devices and fitting components, the inventions are not limited to use with such designs, and will find application in many different fitting designs that use one or more conduit gripping devices. In some fittings, in addition to the conduit gripping devices there may be one or more additional parts, for example seals. The inventions may be used with tube or pipe, so we use the term "conduit" to include tube or pipe or both. We generally use the terms "fitting assembly," "conduit fitting" and "fitting" interchangeably as a shorthand reference to an assembly of typically first and second fitting components along with one or more conduit gripping devices. The concept of a "fitting assembly" thus may include assembly of the parts onto a conduit, either in a finger-tight, partial or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more gripping devices, however, the inventions herein may be used with fittings that include additional pieces and parts. For example, a union fitting may include a body and two nuts.

The term "complete pull-up" as used herein refers to joining the fitting components together so as to cause the one or more conduit gripping devices to deform, usually but not necessarily plastically deform, to create a fluid tight seal and grip of a fitting assembly on a conduit. The conduit in many cases may also be plastically deformed during pull-up. A partial pull-up as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a fitting assembly. A finger tight position ("FTP") or condition refers to the fitting components and conduit gripping devices being loosely assembled onto the conduit to an abutting position where the conduit gripping devices are in axial contact with and between the male and female fitting components, but without any significant tightening of the male and female fitting components together, usually typified by the conduit gripping device or devices not undergoing plastic deformation. We also refer to an initial or first pull-up or make-up to refer to the first time that a fitting is tightened to a complete pulled-up position, meaning that the ferrules and conduit had not been previously deformed. A subsequent pull-up or remake refers to any complete pull-up after a previous pull-up, whether that previous pull-up was the initial pull-up or a later pull-up or remake of the fitting.

We also use the term "fitting remake" and derivative terms herein to refer to a fitting assembly that has been at least once tightened or completely pulled-up, loosened, and then re-tightened to another completely pulled-up position. Effective remakes may be done with the same fitting assembly parts (e.g. nut, body, ferrules), for example, or may involve the replacement of one of more of the parts of the fitting assembly. An effective pull-up or remake or an effectively pulled-up or remade fitting as used herein is one that is effectively tightened (or re-tightened) to establish a mechanically attached connection with a conduit using the same or in some cases one or more replaced fitting parts, without adverse effects on fitting performance as to fluid tight seal and grip. In other words, an effective remake as used herein means a remake in which the fitting performance is not compromised or altered from its original performance criteria, specification or rating (for example, will achieve the same pressure rating upon remake within the allowed number of remakes as may be specified by the manufacturer). When we use the term remake in the context of the various embodiments and inventions herein, we are referring to effective remakes. We use the terms "effective remake" and "reliable remake" interchangeably herein. Reference herein to "outboard" and "inboard" are for convenience and simply refer to whether a direction is axially towards the center of a fitting (inboard) or away from the center (outboard).

We also use the term "flexible" herein to mean a structural characteristic of a member so that the member can deform, strain, bend, deflect, elongate or otherwise move or shift under load without fracturing or breaking. This flexible deformation may accompany a strain induced hardening. This flexible deformation may also accompany a permanent set or plastic deformation or may be a plastic deformation with an attendant elastic deformation, but at least some degree of plastic deformation may be desired to facilitate remakes. Further, the relative elastic and plastic deformations may be influenced or controlled by one or more of a strain hardening of the material from which the member is subsequently fabricated, a heat treated metallurgical or precipitation hardening of the material, and a low temperature interstitial case hardening of the member after fabrication.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions-such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred or desired arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

A significant feature of the inventions described herein is the provision of a retaining structure by which two or more conduit gripping devices (for example, a ferrule set) are retained or held together as a discrete unit, subassembly or cartridge, prior to assembling the unit with fitting components to form a complete fitting. By "cartridge" we mean a group of parts retained together as a discontinuous unit, subassembly or preassembly. We therefore use the terms cartridge, unit, subassembly and preassembly synonymously herein in the context of a discontinuous structure. We also use the term "ferrule cartridge" or "conduit gripping device cartridge" interchangeably to refer to a unit or subassembly made up of at least two ferrules or conduit gripping devices held together as a discrete or standalone unit. In particular, a "ferrule cartridge" includes two or more ferrules held together as a discrete unit or subassembly, and may include additional parts, for example, seals. Thus, a ferrule cartridge may provide a complete ferrule set for a fitting.

We use the term "discontinuous" to describe the conjoined nature of the cartridge or preassembly in the sense that the two or more conduit gripping devices are manufactured as separate and discrete components and remain separate and discrete components, although in accordance with the inventions herein these parts are retained together as a discrete cartridge, subassembly or preassembly, and further wherein after assembly or even a complete pull-up the parts remain discrete and may be disassembled into their constituent discrete parts if so desired. Thus, the terms "discontinuous" or "conjoined" are used herein to distinguish from fitting designs in which two conduit gripping devices are attached to or made integral with each other and may in some designs break off or detach from each other during complete or partial pull-up. In a discontinuous type structure then, as used in this disclosure, the two or more conduit gripping devices release, disengage or otherwise become separable from each other during either partial or complete pull-up without requiring a fracture, shear or other separation of material. In some of the cartridge or subassembly embodiments herein, however, an adhesive may be used as part of the retaining structure. Despite the initial assembly as a cartridge, the conduit gripping devices individually perform as designed and the retaining structure does not interfere with operation and performance of the conduit gripping devices during pull-up. The terms "discontinuous" or "conjoined" are further intended to include broadly the idea that the two or more conduit gripping devices may be loosely or alternatively snugly retained together as a discrete subassembly. The term "connect" and variations thereof as used herein with respect to the discontinuous cartridge means that the conduit gripping devices are initially formed or manufactured as separate, discrete and distinct parts, and then held together in a discontinuous manner as a cartridge or subassembly so as to be able to be easily joined with fitting components (for example, a nut and body) to form a fitting assembly, but further that the conduit gripping devices will otherwise retain their expected form, fit and function without interference from the retaining structure.

As an overview of the inventive concepts disclosed herein, there are a number of characteristics for a discontinuous ferrule cartridge retaining structure that may not necessarily be desirable in all cases. These characteristics may in some applications involve tradeoffs as to which ones may have greater significance in overall fitting performance and use as will be apparent from the following discussion. This list is not intended to be an exhaustive list of all characteristics, and one or more of the ones discussed herein may not be notable or needed for specific applications.

One characteristic we refer to as a reasonably robust connection or RRC. By RRC we mean that the retaining structure is designed such that the connected conduit gripping devices will not easily come apart with normal handling, either individually or bulk, during subassembly, inventory, and subsequent assembly with fitting components to form a fitting assembly. The terms "normal" and "easily" as used herein intentionally indicate that the degree to which the ferrule cartridge does not come apart during use is a matter of design choice. But to better understand those terms, we view "normal" handling as any handling of the ferrule cartridge that can be expected or likely to happen throughout manufacturing, assembly and use of the ferrule cartridge. This may include handling by manufacturing personnel, inventory personnel, shipping personnel and end users. It can be expected that during such normal handling a ferrule cartridge may be exposed to forces that could tend to knock the conduit gripping devices loose or even separate. For example, the ferrule cartridge may be accidentally dropped from several or many feet onto a hard floor or against a hard object or surface at various installations or manufacturing/assembly stages. The designer may determine the level of force that the ferrule cartridge can withstand without damage to the parts or separating or loosening as needed. Normal handling therefore would not include the use of excessive or damaging force to attempt purposely to separate the conduit gripping devices. However, the designer may choose to facilitate the option of being able to separate the parts using proper tools and procedures if so desired. In other words, the designer has the option to determine how easily the ferrule cartridge may be disassembled into its constituent parts. In some applications, the ferrule cartridge might be designed so that it cannot be separated without damaging one or more of the constituent parts, and in other designs the ferrule cartridge may be disassembled with simple manual force, and a wide range of available "ease" in between.

The aspect of ease of separation of the discontinuous cartridge components also raises the terms disengage, release or separation and derivative forms thereof when used in the context of describing the ferrule cartridge. We use these terms interchangeably in two contexts. The first context is the separation or disassembly of the ferrule cartridge into its constituent parts when done prior to installation of the connected ferrules or conduit gripping devices into a fitting. In the other context, we refer to disengagement, separation or release of the ferrules from the retaining structure that will occur during pull-up of the fitting assembly. Now, in this latter context, the fitting is being pulled-up so the ferrules are not literally separated from each other, and in fact are driven together axially so as to deform and grip the conduit. But we refer to a ferrule or ferrules as releasing or disengaging from the retaining structure during pull-up to describe that the retaining structure no longer holds the ferrules together. For example, in the FTP, the ferrules may not be released from the retaining structure, and an installer could easily back the nut off the body and remove the ferrule set cartridge or subassembly. However, at a selectable axial position of the ferrules relative to each other during a pull-up operation, the retaining structure will no longer be functional to hold the ferrules together. Having the ferrules disengage or release from the retaining structure may be used, for example, to avoid rotation of the conduit during pull-up which might occur due to torque transmission from the nut, through the retained ferrules to the conduit. Reference to a ferrule or ferrules releasing or disengaging from the retaining structure is intended to convey the idea that the ferrules as a subassembly are no longer held together by the retaining structure. In the illustrated embodiments herein, only one of the ferrules is directly disengaged from the retaining structure, for example, the rear ferrule releasing from the extension. But in the sense that the two ferrules no longer are held together by the retaining structure, one may consider that the "ferrules" have disengaged because the retaining structure no longer functions to hold the ferrules together. Therefore, whether we refer to one ferrule or two ferrules being disengaged or no longer held by the retaining structure, the concept is that the retaining structure no longer holds the two ferrules together.

Another characteristic of the discontinuous ferrule cartridge concept relates to maintaining a sufficient bore diameter (SBD). By SBD we mean that the retaining structure does not cause shrinkage or compression of the interior bore diameter of any of the conduit gripping devices that would adversely encroach on the bore tolerance to allow a conduit to be inserted through the bore. A related characteristic we refer to as axial bore alignment (ABA) by which we mean that the retaining structure does not cause an axial misalignment of the conduit gripping devices that would adversely encroach on the effective through bore tolerance for inserting a conduit through both devices. ABA may refer to axial alignment of the conduit gripping device bores with respect to each other or maintaining an axial through bore for each conduit gripping device (in other words, not adversely bending or deflecting a conduit gripping device so as to deform a portion of its bore off-axis).

Another characteristic of the discontinuous ferrule cartridge concept is preferably to maintain proper finger tight contact (FTC) when the cartridge is assembled into a fitting to a finger-tight position. Fittings are commonly assembled first to a FTP by which the various parts are assembled onto a conduit in a fairly loose manner and then snugged up manually without enough force to deform the conduit gripping devices but with sufficient force to assure FTC. For example, in an exemplary embodiment, FTC means that there is axial contact between the front portion of the front ferrule or conduit gripping device with the tapered camming surface of the body; axial contact between the front portion of the rear ferrule or conduit gripping device and the camming surface of the front ferrule; and axial contact between the drive surface of the nut fitting component, and the driven surface of the rear ferrule or conduit gripping device. It is usually desirable, although not necessarily required in all cases, that these axial contacts are present in the FTP. An assembler can usually feel or sense this complete axial contact by noticing a distinctive resistance to further manual tightening of the fitting components together.

Another characteristic of the retaining structure for a discontinuous ferrule cartridge is preferably to have the retaining structure not adversely interfere with the functional separation of the conduit gripping devices or the form, fit and function of the conduit gripping devices during pull-up, thereby permitting each conduit gripping device to interact with the body and nut and each other to effect conduit grip and seal. We refer to this characteristic as maintaining two ferrule function (TFF), it being understood that none of these characteristics are limited by the term "ferrule" and not limited to only use of two conduit gripping devices.

Next we will discuss three types of discontinuous ferrule cartridge connection embodiments that are directed to the above noted characteristics. It will be readily apparent that some of these embodiments achieve one or more of the characteristics, perhaps to varying degrees, thus providing a designer with a number of choices. But alternative embodiments will be available that do not necessarily achieve any of the above characteristics or to lesser degree, yet still being within the scope of the claimed inventions. The types are not necessarily presented in any preferred order. We then will describe exemplary embodiments of each type. Although the descriptions reference ferrules, the inventions may be used with other conduit gripping devices other than just those known or referred to as ferrules.

The first type (Type 1), we refer to as a radial compression connection. In one embodiment, a retaining structure is provided that may be realized in one example in the form of a flexible portion of the front ferrule that protrudes axially from the back end of the front ferrule. This flexible portion may be integrally formed with the front ferrule or attached thereto. A forward portion of the rear ferrule may be press fit into the flexible portion of the front ferrule to hold the two ferrules together as a ferrule cartridge or subassembly. The protrusion is preferably flexible enough to allow the rear ferrule to be inserted a sufficient distance to provide a reasonably robust connection, but without radially compressing the rear ferrule beyond an acceptable SBD. In press fit configurations of the prior art, the press fit operation could radially compress the rear device so as to adversely affect the through bore, or at least there is no control over the amount of radial compression other than to use special fixturing and control during assembly. Use of a flexible portion allows the designer to strike a balance between having an adequately robust connection without adversely affecting the SBD, allowing easier assembly of the parts. This is because the flexible portion may be used so that ferrule deformation during the press fit operation is taken up by the flexible member and not the body of the front or rear ferrule. In this manner, the flexible portion does not interfere with the basic geometry or operation of either ferrule.

By having the flexible portion extend axially back from the main body of the front ferrule, upon pull-up the retaining structure will not interfere or adversely affect the operation of either ferrule as to each other, the conduit or the fitting components. Moreover, unlike the prior art, the retaining structure, in a Type 1 arrangement, used for the press fit does not need to participate in the form, fit or function of the front ferrule as that ferrule relates to the overall fitting. In other words, the front ferrule may operate the same way whether the extension is present or not. In the prior art designs, the front device and in particular the retaining structure remains in contact with the back device and is not separated from the operation of the devices during pull-up.

Thus, in a Type 1 design, the first and second conduit gripping devices or ferrules disengage from the retaining structure at a selectable position during pull-up. In order that the retaining structure not interfere or adversely affect the form, fit and function of the ferrules, it is preferred although not necessary that the retaining structure allow the ferrules to disengage or release from the retaining structure after just a slight axial advance of the rear ferrule relative to the front ferrule, for example, after about 0.01 inch to about 0.015 inch of movement of the rear ferrule relative to the front ferrule. These are only intended to be exemplary values, it being understood that the preference is that the retaining structure no longer hold the ferrules together after some pre-determinable displacement of the ferrules relative to each other. However, the axial position of the rear ferrule relative to the front ferrule at which the ferrules become disengaged may be selected by the designer as needed for a particular application.

The second type (Type 2), we refer to as a controlled axial position connection. In one embodiment, a retaining structure provides a hook-like member on the front ferrule that moves over a portion of the rear ferrule during assembly of the ferrule cartridge. This movement positions the hook-like member in such as manner as to significantly reduce radial load on the rear ferrule, but also to axially press the rear ferrule contact surface against the front ferrule camming surface. By assuring this axial contact, a robust connection is made with little or no effect on SBD, and at the same time providing FTC as between the ferrules even before the ferrule cartridge is installer into a fitting. This also eliminates axial dead space at the ferrule contact area, which dead space otherwise would take up some of the pull-up stroke (for example, when pull-up is carried out based on number of turns). This assures that there is no dead space between the ferrules which may be desirable in some fitting designs. In a Type 2 approach, rather than using the hook-like member, the ferrules may alternatively be joined with an adhesive as part of the retaining structure in such a manner as to assure no dead space between the ferrules and to further assure metal to metal contact where the contact surface of the rear ferrule contacts the camming surface of the front ferrule, both for FTP and throughout pull-up. The alternative use of an adhesive also releases the ferrules during pull-up and by being positioned out of the contact area between the ferrules, does not adversely affect the operation of the ferrules during pull-up. As with Type 1, the Type 2 concept allows the ferrules to individually perform as designed to achieve the TFF characteristic if so desired.

The third type (Type 3) we refer to as a loose ferrule connection. In one embodiment, a retaining structure holds the ferrule together but without any significant radial or axial load between the ferrules. This looser assembly allows some degree of freedom of movement of the ferrules with respect to each other. For example, the ferrules can pivot somewhat with respect to each other and the retaining structure, and also freely rotate with respect to each other. The ferrules can also rotate with respect to each other about a common central axis, thus eliminating any tendency of the connection to induce twist or torque into the conduit during pull-up before the ferrules release from the retaining structure. The Type 3 approach may be used to best achieve all five of the above-mentioned characteristics (RRC, SBD, ABA, FTC and TFF), albeit without controlled axial position because of the intentionally looser connection. As with the Type 1 and Type 2 concepts, the Type 3 concept allows the ferrules to individually perform as designed to achieve the TFF characteristic if so desired.

The retaining structure typically will include a first portion that is associated with one of the conduit gripping members and a second portion that is associated with the other conduit gripping member. In various embodiments, the retaining structure may involve cooperating structural features added to both conduit gripping devices (or alternatively using an additional part) as compared to what might be the design of those conduit gripping devices in a non-cartridge design. In such cases we refer to the retaining structure having two portions. But in other embodiments, the retaining structure may be a structural feature associate with one of the conduit gripping devices that utilizes a structural feature of the other conduit gripping device even if that other device has not been modified to allow for a cartridge design. Therefore, as used herein, the concept of a retaining structure does not necessarily require that the retaining structure be identified as two distinct parts. Several exemplary ferrule assembly embodiments according to the Type 1, Type 2, and Type 3 concepts are described in U.S. Pat. No. 9,267,627 (the "'627 Patent"), entitled "Ferrule Assembly for Conduit Fitting" and US Patent Application Pub. No. 2015/0323110 (the "'110 Applications"), entitled "Conduit Fitting with Components Adapted for Facilitating Assembly," the entire disclosures of both of which are incorporated by reference herein.

In alternative embodiments, the retaining structure may be a separate part or element that attaches the conduit gripping devices together, but the exemplary embodiments herein illustrate retaining structures that are part of and formed integral with one or alternatively both of the conduit gripping devices. As noted above, the term "connecting" and variations thereof as used herein with respect to the subassembly means that the conduit gripping devices are initially formed or manufactured as separate and distinct parts, and then joined together in an interlocking or secured manner so as to be able to be easily installed as a single piece unit into a fitting. This is distinguished from some prior art arrangements in which two conduit gripping devices are integrally formed together such as machining both devices from a single piece of material or attaching a conduit gripping device to another by welding, for example.

In certain ferrule cartridge embodiments of the above incorporated '627 Patent, as reproduced in FIG. 1 of the present application, a retaining extension 40 of the front ferrule 24 flexes or expands radially outward to receive a radial protrusion or crown portion 36 of the rear ferrule 30 during the cartridging process, with the extension 40 snapping back radially inward to retain the front and rear ferrules 24, 30 together as a cartridged subassembly.

Figure 2:
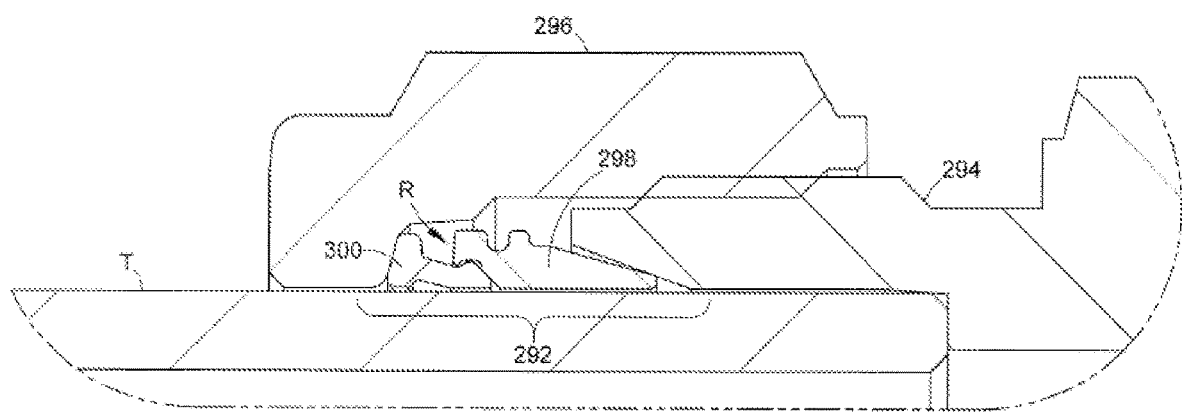
FIG. 2 illustrates a partial cross-sectional view of another conduit fitting having a known cartridged ferrule subassembly according to another exemplary embodiment.

In certain ferrule cartridge embodiments of the above incorporated '110 Applications, as reproduced in FIG. 2 of the present application, a retaining extension R of the front ferrule 298 includes a radially extending hook, barb, tab or other protrusion that is elastically deformed axially inward and radially outward when the rear ferrule 300 is axially pressed against the front ferrule during a cartridging operation, such that a front portion of the rear ferrule is received in a recess or pocket defined by the retaining extension. The protrusion at least partially snaps back radially inward and axially outward over the front portion of the rear ferrule to retain the front and rear ferrules together as a cartridged subassembly. In some such embodiments, an axially extending web portion of the retaining extension also flexes or expands radially outward to facilitate cartridging engagement of the front and rear ferrules. In other embodiments, the axially extending web portion is configured (e.g., by providing a radially thicker web portion, as shown in FIG. 42B of the '110 Application) to limit or eliminate radial flexing of the retaining extension web portion relying primarily or entirely on axial deformation of the radial protrusion to effect ferrule cartridging.

According to an exemplary aspect of the present application, a retaining extension of a front ferrule may be shaped or oriented such that a radially inward extending end portion of the retaining extension extends radially inward and axially outward for oblique engagement of the end portion with the forward surface of the rear ferrule when the front and rear ferrules are axially moved into contact during a cartridging operation. When an axial compression force is applied to the pre-cartridged ferrules, the retaining extension end portion is elastically deformed axially outward and radially outward, as it slides along the rear ferrule forward surface, to advance the front portion of the rear ferrule into a pocket or recess disposed between the front ferrule camming surface and retaining extension end portion. When the retaining extension end portion aligns with a recessed portion of the rear ferrule, the retaining extension end portion snaps radially and axially inward into the recessed portion for cartridged retention of the rear ferrule with the front ferrule. Engagement between the retaining extension end portion and the outer radial portion (e.g., notch or recess) of the rear ferrule may provide a radial load between the front and rear ferrules (a "Type 1" connection as described above) and/or an axial load between the front and rear ferrules (a "Type 2" connection as described above). Similarly, engagement between the front ferrule camming surface and the rear ferrule contact surface may provide a radial load between the front and rear ferrules and/or an axial load between the front and rear ferrules. In another exemplary embodiment, the front ferrule retaining extension and the rear ferrule recess are dimensioned such that the snap fit engagement of the front and rear ferrules provides for a loose ferrule connection (e.g., axial and radial clearance) allowing some degree of freedom of movement of the ferrules with respect to each other (a "Type 3" connection as described above). Regardless of whether the ferrule connection is a Type 1, Type 2, or Type 3 connection, the front and rear ferrules may be configured to properly function (e.g., produce a proper conduit grip and seal), for example, by dimensioning the retaining extension to limit axial and/or radial load.

Figure 3:
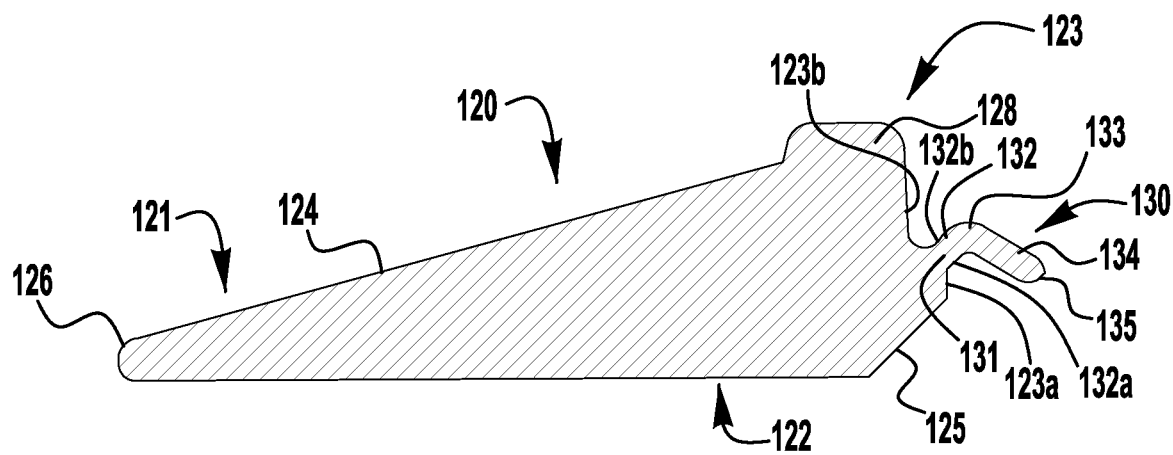
FIG. 3 illustrates a half-longitudinal cross-sectional view of a first or front ferrule configured to facilitate cartridging assembly with a second or rear ferrule according to an exemplary embodiment of the present application.
Figure 6:
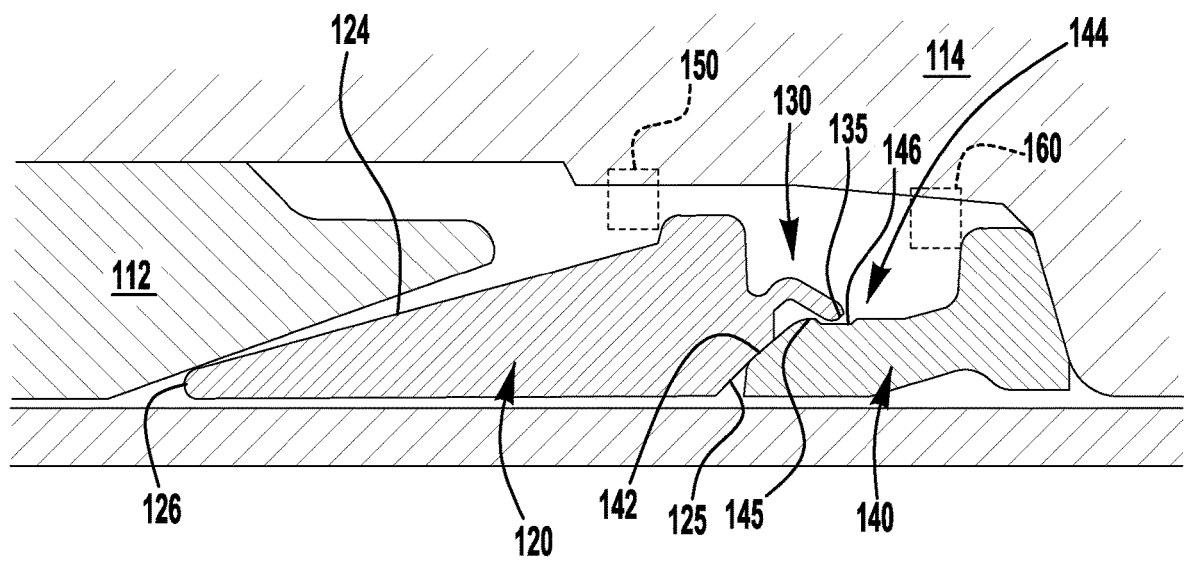
FIG. 6 illustrates a partial cross-sectional view of the ferrule subassembly of FIG. 5, shown installed in a conduit fitting.
Figure 6:
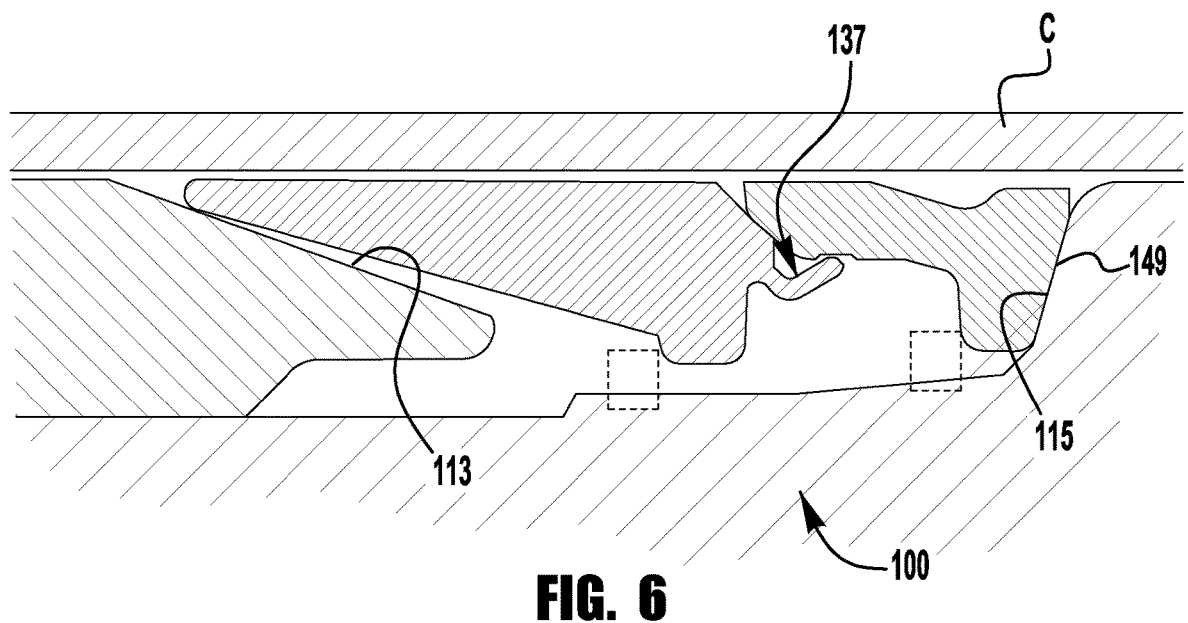
Figure 7:
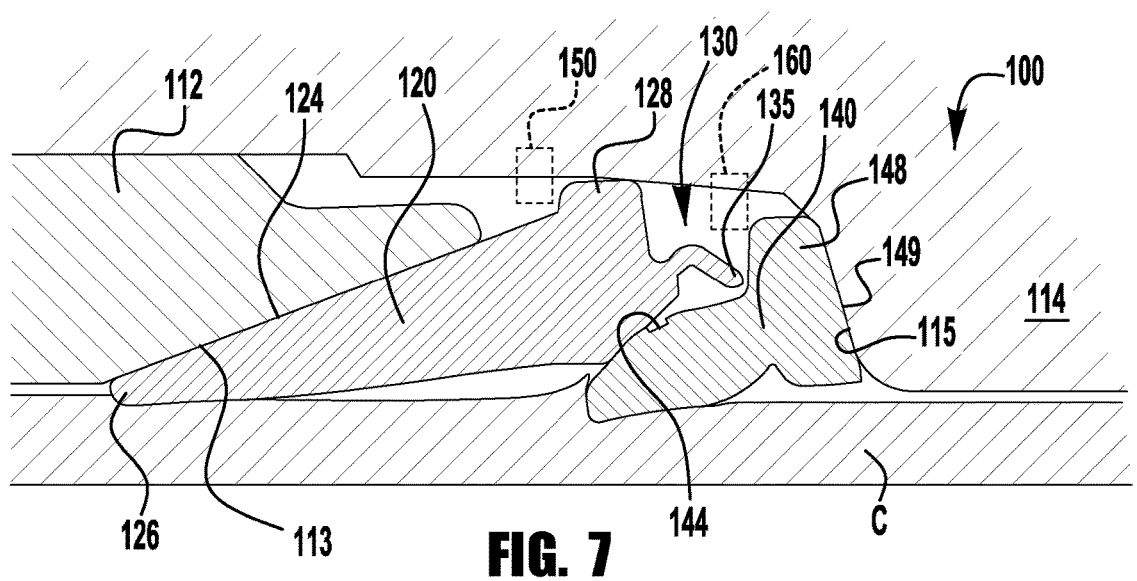
FIG. 7 illustrates a partial cross-sectional view of the conduit fitting of FIG. 6, shown assembled with a conduit in a pulled-up condition.
Figure 8:
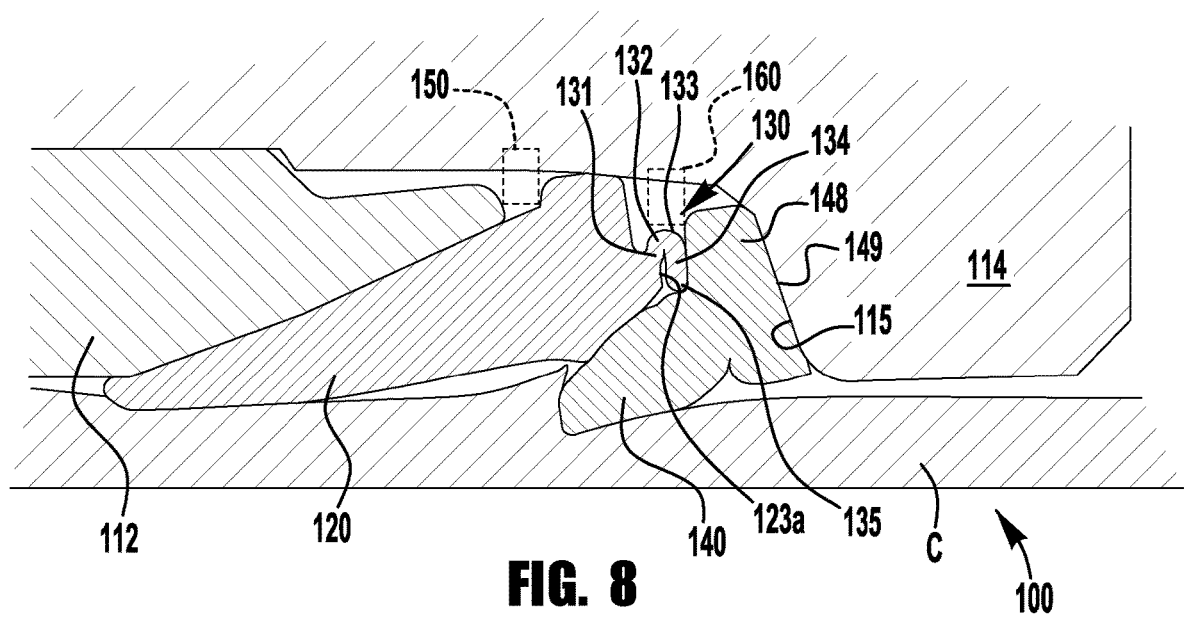
FIG. 8 illustrates a partial cross-sectional view of the conduit fitting of FIG. 7, shown assembled with a conduit in a subsequent, further pulled-up or remake condition.

FIG. 3 illustrates a half-longitudinal cross-sectional view of an exemplary embodiment of a first or front ferrule 120 for a two-ferrule conduit fitting. As shown in FIGS. 6-8, the conduit fitting may be a male fitting 100 (i.e., having a male threaded body 112 and female threaded nut 114). Alternatively (not shown), the ferrule may be used in a female fitting (i.e., having a female threaded body and male threaded nut) or a fitting having some other type of pull-up arrangement. Except for the front ferrule 120, the fitting 100 may (but need not) operate the same as described in the embodiments of the above incorporated '627 Patent and '110 Application, and the cartridging process may (but need not) be carried out in a similar manner).

Figure 3A:
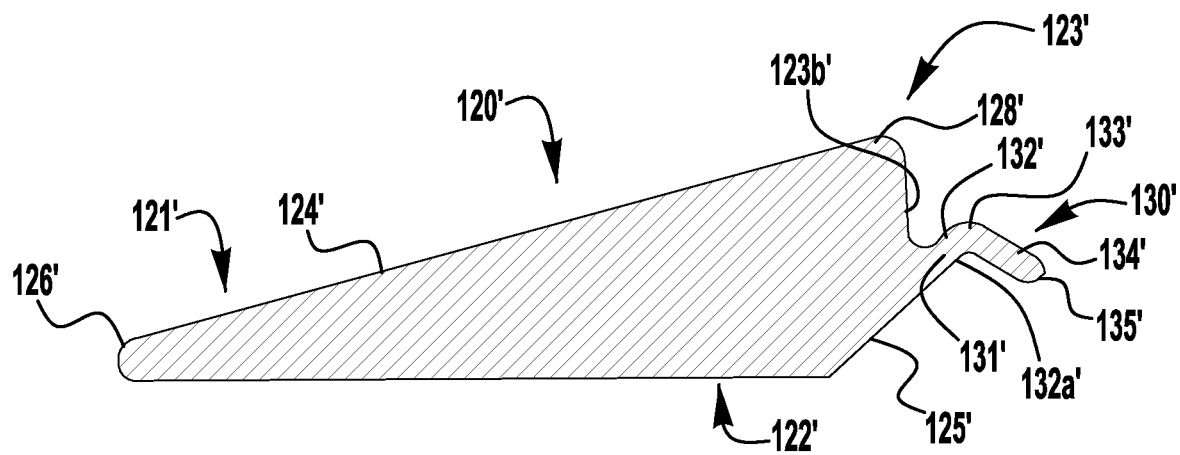
FIG. 3A illustrates a half-longitudinal cross-sectional view of another first or front ferrule configured to facilitate cartridging assembly with a second or rear ferrule, according to another exemplary embodiment of the present application.

The front ferrule 120 includes a central through bore defined by an interior bore wall 122 extending axially through front and rear body portions 121, 123 of the ferrule 120. The front body portion 121 includes a forward tapered surface 124 extending from a front end 126 to an outer flange portion 128 of the rear body portion 123. In other exemplary embodiments, as shown, for example, in FIG. 3A, the outer flange portion may be omitted, with the tapered surface 124' extending to the rear body portion 123'. Referring back to the exemplary embodiment of FIG. 3, the rear body portion further defines an interior tapered camming surface 125 extending rearward from the interior bore wall 122. A retaining extension 130 is joined with (e.g., integrally formed with) the rear body portion 123 at an inner hinge portion 131, spaced radially outward of the camming surface 125 by an inner rear radial surface 123a, and extending axially rearward and radially inward from the inner hinge portion 131. In other exemplary embodiments, as shown, for example, in FIG. 3A, the inner rear radial surface may be omitted, with the camming surface 125' extending, either continuous or at an oblique angle, to an interior surface 132a' of the extension 130'. While the retaining extension 130, 130' may be a circumferentially continuous annular extension, in other embodiments, the retaining extension may be circumferentially discontinuous. For example, the retaining extension may include one or more discrete tabs, extensions or other such flexible segments, for example, providing for increased flexibility and reduced resistance to cartridging and/or deformation during pull-up.

Figure 4:
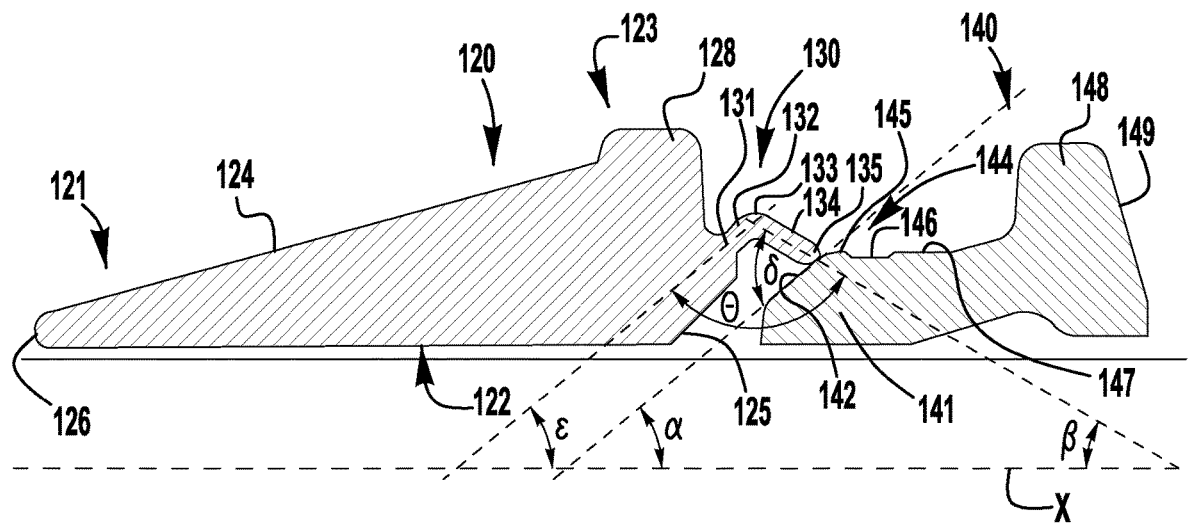
FIG. 4 illustrates a half-longitudinal cross-sectional view of the front ferrule of FIG. 3, shown arranged with a second or rear ferrule in a pre-cartridged condition.

The retaining extension 130 of the front ferrule 120 may be configured to engage a forward tapered surface of a corresponding second or rear ferrule when the front ferrule 120 is radially aligned with the rear ferrule (e.g., on a pin or other tool inserted through the aligned interior bores of the front and rear ferrules) and the front and rear ferrule are axially moved into contact with each other. FIG. 4 illustrates an exemplary ferrule arrangement including front and rear ferrules 120, 140 aligned for axial contact with each other, with the retaining extension 130 engaging a tapered forward contact surface 142 of the rear ferrule 140. The exemplary rear ferrule 140 has a front portion with a tapered forward contact surface 142 for camming engagement with the camming surface 125 of the front ferrule, an outer radial portion 144 extending axially rearward of the forward contact surface 142, and a rear portion (e.g., rear flange portion 148) defining a rear driven surface 149.

Figure 5:
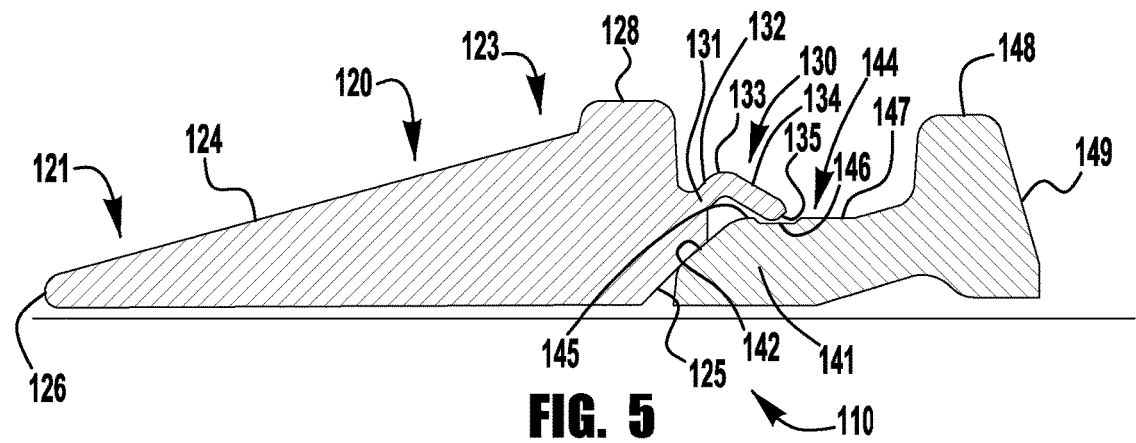
FIG. 5 illustrates a half-longitudinal cross-sectional view of the front and rear ferrule of FIG. 4, shown assembled in a cartridged condition as a ferrule subassembly.

Similar to exemplary embodiments of the above incorporated '627 Patent and '110 Application, at least an end portion 135 of the front ferrule retaining extension 130 may be configured to expand radially outward when the front ferrule 120 is axially pressed or otherwise forced against the rear ferrule 140, such that the outer radial portion 144 at the front end 141 of the rear ferrule 140 advances past the retaining extension end portion 135, with the end portion engaging the outer radial portion 144 to retain the rear ferrule 140 with the front ferrule 120 (as shown in FIG. 5).

While many different types of bending or flexing of a front ferrule retaining extension may provide for retaining engagement of the front ferrule with the rear ferrule, the present application contemplate a retaining extension that is oriented to bend or flex radially outward and axially rearward when forced against a tapered forward contact surface of the rear ferrule. To provide for this radially outward and axially rearward bending, as shown, for example, in FIG. 5, at least an outer axial portion 134 of the retaining extension 130 may extend at an oblique angle with respect to the tapered forward contact surface 142 of the rear ferrule 140, such that when the front ferrule 120 is axially pressed against the rear ferrule 140, the end portion 135 of the retaining extension 130 slides along the tapered contact surface 142 of the rear ferrule 140 to bend or flex the retaining extension about the inner hinge portion 131 radially outward and axially rearward, thereby radially expanding the retaining extension end portion 135. While many different suitable relative angular orientations of the retaining extension 130 and forward contact surface 142 may be utilized, in one embodiment, the outer axial portion 134 of the retaining extension 130 and the forward contact surface 142 abut, prior to cartridging (FIG. 4) to form a difference angle S of between about 90° and about 60°, or between about 80° and about 70°, or about 75°. In one exemplary embodiment, the forward contact surface 142 forms an axially rearward facing angle α, with the central axis X, of between about 500 and about 30°, or between about 450 and about 35°, or about 40°, and the outer axial portion 134 of the retaining extension 130 forms an axially forward facing angle β, with the central axis X, of between about 500 and about 20°, or between about 400 and about 30°, or about 35°. As shown, the inner hinge portion 131 may have a thickness smaller than a thickness of a remainder of the retaining extension 130 to promote bending or flexing of the retaining extension at the inner hinge portion during cartridging.

The oblique outer axial portion 134 of the retaining extension 130 may form an axially elongated hook portion having a hoop strength sufficient to provide an increased elastic radial inward force (for example, as compared to the hook portions of the embodiments of the above incorporated '627 Patent and '110 Application) to provide increased retaining engagement of the outer radial portion 144 of the rear ferrule 140. As shown in FIGS. 4-6, the outer radial portion 144 of the rear ferrule 140 may include a forward cylindrical surface 145 and an annular recessed portion 146 axially rearward of the forward cylindrical surface. When the retaining extension end portion is advanced past the enlarged forward cylindrical surface 145 and is aligned with the annular recessed portion 146, the retaining extension elastically snaps into engagement with the recessed portion 146 for a cartridged ferrule connection (FIG. 5). As shown, the rear ferrule 140 may include a rearward cylindrical surface 147 separated from the forward cylindrical surface 145 by the recessed portion 146. The rearward cylindrical surface may, but need not, be substantially equal in diameter to the forward cylindrical surface. The size, shape and orientation of the front ferrule retaining extension and outer radial portion 144 may be selected to provide a Type 1, 2 or 3 cartridge connection between the front ferrule and the rear ferrule 140, as described in greater detail above.

While the retaining extension 130 may completely return to its original unstressed position upon cartridging, some plastic deformation may occur while still maintaining a reasonably robust cartridged connection between the front and rear ferrules 120, 140. It should be noted that if a particular design herein presents excessive deformation from plastic deformation as a result of cartridging, a post-cartridging rolling or crimping step may be used to compress the cartridge feature of the front ferrule back to or sufficiently close to its original state to provide the desired robustness of the ferrule cartridge. The size, shape and orientation of the retaining extension 130 and outer radial portion 144 may be selected to provide a Type 1, 2 or 3 cartridge connection between the front ferrule 120 and the rear ferrule 140, as described in greater detail above.

Other types of rear ferrule outer radial (i.e., extension engaged) portions may additionally or alternatively be utilized. For example, FIG. 10 illustrates an alternative rear ferrule 240 for use, for example, with the front ferrules 120, 220 of FIGS. 3-9, having an outer radial portion 244 including a raised portion or crown portion 245 and an annular recessed portion 246 axially rearward of the crown portion. When the front and rear ferrules are axially pressed together during cartridging, the retaining extension bends or flexes axially rearward and radially outward (about an inner hinge portion) over the crown portion 245 and elastically snaps radially inward and axially forward, such that the retaining extension end portion s received in the recessed portion 246 for cartridging retention of the front and rear ferrules, and the crown portion 245 is received in an interior recess or pocket 137, 237 defined by the retaining extension 130, 230 and the rear body portion 123, 223 of the front ferrule 120, 220. The size, shape and orientation of the front ferrule retaining extension and outer radial portion 244 may be selected to provide a Type 1, 2 or 3 cartridge connection between the front ferrule and the rear ferrule 240, as described in greater detail above.

Figure 9:
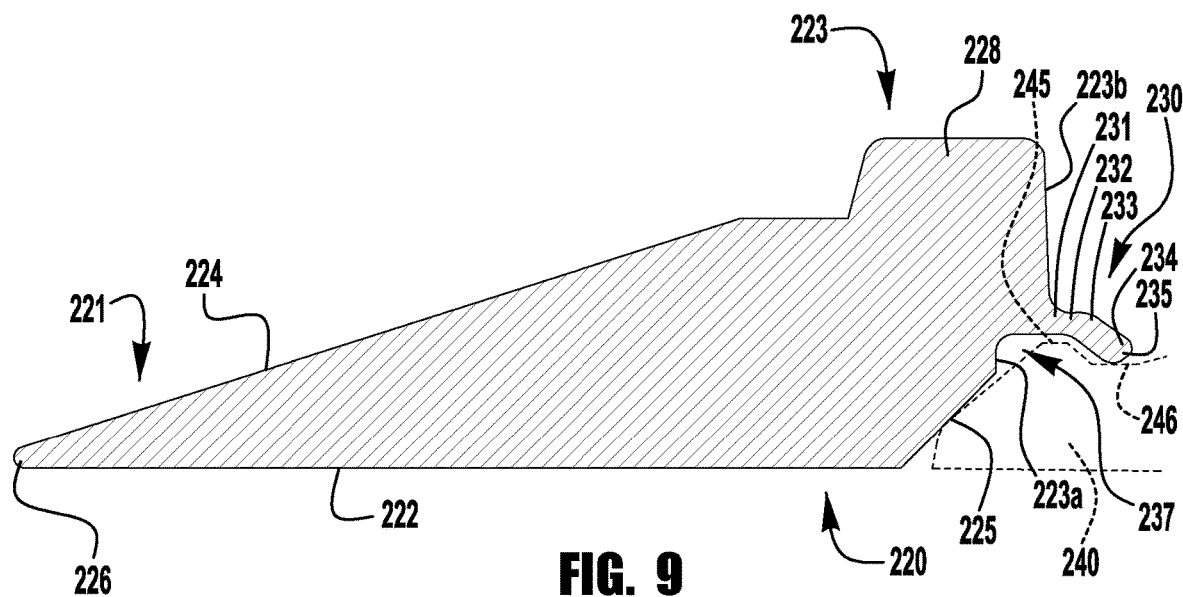
FIG. 9 illustrates a half-longitudinal cross-sectional view of another exemplary front ferrule for use in a cartridged ferrule subassembly, according to another exemplary embodiment of the present application.
Figure 10:
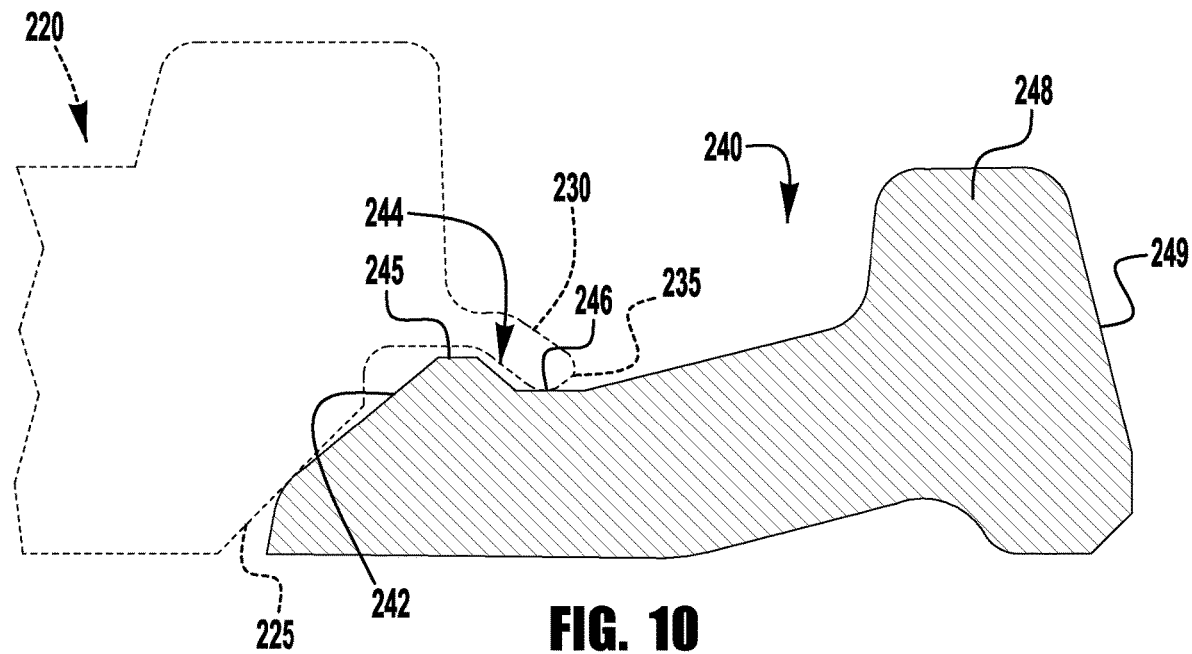
FIG. 10 illustrates a partial cross-sectional view of another exemplary rear ferrule for use in a cartridged ferrule subassembly, according to another exemplary embodiment of the present application.
Figure 11:
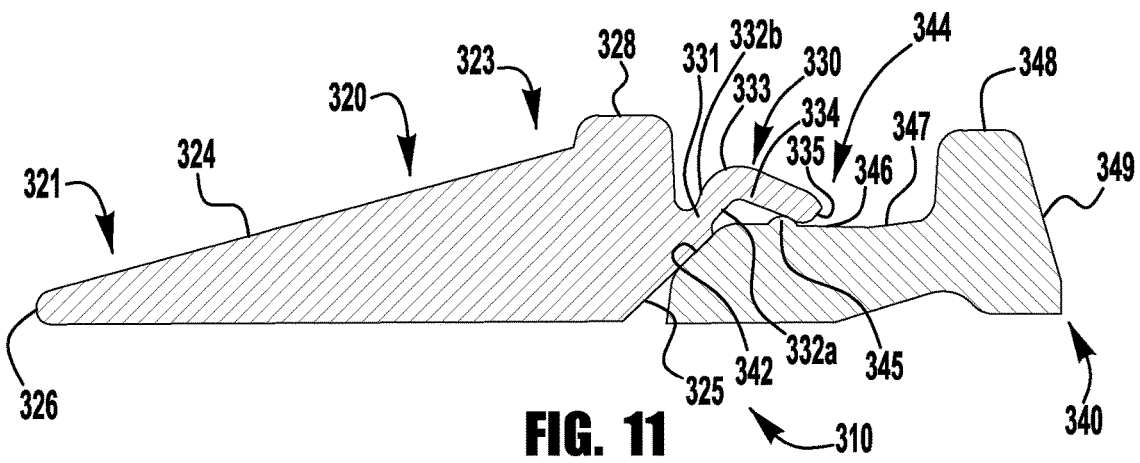
FIG. 11 illustrates a half-longitudinal cross-sectional view of another exemplary front and rear ferrule, shown assembled in a cartridged condition as a ferrule subassembly, according to another exemplary embodiment of the present application.

As shown in FIGS. 9 and 10, the crown portion 245 of the rear ferrule may be substantially continuous with the tapered forward contact surface 242, providing increased surface contact between the front ferrule camming surface 225 and the front of the rear ferrule 240 during initial fitting pull-up, which may accelerate radial expansion of the front ferrule rear portion 223 and decelerate radial compression of the rear ferrule front portion. In other embodiments, the back ferrule of a cartridged ferrule set may include a captured crown portion that is axially offset rearward of the back ferrule contact surface, for example, to delay or retard radial expansion of the front ferrule rear portion and accelerate radial compression of the rear ferrule front portion. FIG. 11 illustrates an exemplary ferrule subassembly 310, shown in a cartridged condition, including front and rear ferrules 320, 340. The front ferrule 320 includes a rear body portion 323 defining an interior tapered camming surface 325, and a retaining extension 330 joined with (e.g., integrally formed with) the rear body portion 323 at an inner hinge portion 331 and extending axially rearward and radially inward from the inner hinge portion. The rear ferrule 340 includes a front portion with a tapered forward contact surface 342 for camming engagement with the camming surface 325 of the front ferrule 320, an outer radial portion 344 extending axially rearward to a rear flange portion 348 defining a rear driven surface 349, and a raised portion or crown portion 345 axially offset rearward from the contact surface 342.

Referring back to FIGS. 4 and 5, similar to exemplary embodiments of the above incorporated '627 Patent and '110 Application, at least an end portion 135 of the front ferrule retaining extension 130 may be configured to expand radially outward when the front ferrule 120 is axially pressed or otherwise forced against the rear ferrule 140, such that the outer radial portion 144 at the front end 141 of the rear ferrule 140 advances past the retaining extension end portion 135, with the end portion engaging the outer radial portion 144 to retain the rear ferrule 140 with the front ferrule 120 (as shown in FIG. 5).

In still other embodiments (not shown), the rear ferrule may be provided without an extension-receiving recessed portion (e.g., instead including a cylindrical outer surface), such that cartridged retention of the front and rear ferrules relies on elastic hoop stress gripping engagement of the rear ferrule outer radial portion by the outward flexed retaining extension.

FIG. 6 illustrates the ferrule subassembly 110 installed between a male threaded fitting body 112 and a female threaded fitting nut 114 of a conduit fitting 100 prior to pull-up of the fitting on a conduit (e.g., in a loosely assembled or finger tight condition), with the forward tapered surface 124 of the front ferrule 120 engaging a tapered interior camming surface 113 of the fitting body, and the rear driven surface 149 of the rear ferrule 140 engaging a radial drive surface 115 of the fitting nut. The parts 112, 114, 120 and 140 illustrated herein, other than with the ferrule cartridge retaining arrangements, may be structurally and functionally consistent with fitting components described in a number of issued and pending patent Applications, including U.S. Pat. Nos. 5,882,050 and 6,629,708 which are fully incorporated herein by reference.

FIG. 7 illustrates the conduit fitting 100 in a pulled-up condition on a conduit C. As shown, when the fitting 100 is pulled-up on the conduit C, the rear portion of the front ferrule 120 is expanded radially outward, and the front portion of the rear ferrule 140 is compressed radially inward, thereby disengaging the retaining extension 130 from the outer radial portion 144 of the rear ferrule. This assures that the retaining extension 130 does not in any manner affect the pull-up and operation of the ferrules 120, 140 as the nut 114 and body 112 are tightened together. The ferrules move, grip and seal in the same manner, for example, as described in the above referenced patents, and the retaining extension does not impede relative axial advance of the rear ferrule 140 with respect to the front ferrule 120 during pull-up. The axial position at which the outer radial portion 144 no longer engages the retaining extension 130 will depend on various geometry considerations such as the diameter of the end portion 135 and the diameter of the outer radial portion 144, as well as the various angles of contact which will determine how quickly the front portion of the rear ferrule is radially driven inward relative to axial displacement. The designer may choose to design the retaining structure so as to have the disengagement occur at a desirable axial position during pull-up. For example, the designer may prefer that the ferrules disengage or release from the retaining structure even after a partial pull-up, or almost immediately when the ferrules first start to be axially moved towards one another. In any case, the retaining structure may be configured such that it does not interfere with the normal pull-up operation of either ferrule or the nut and body fitting components.

While the entire retaining extension may extend axially rearward and radially inward at an oblique angle with respect to the rear ferrule contact surface (e.g., as a continuous, tapered conical wall, not shown), in one embodiment, the retaining extension may include an inner axial portion joined with the rear body portion of the ferrule at the inner hinge portion, and an outer axial portion joined with the inner axial portion and extending axially rearward and radially inward from the inner axial portion. In such an arrangement, the inner axial portion may extend radially outward from the inner hinge portion (e.g., as shown in FIGS. 3-8). Alternatively, as shown in the exemplary front ferrule 220 of FIG. 9, the inner axial portion 232 of the retaining extension 230 may extend substantially parallel to the ferrule axis X. In yet another embodiment (not shown), the inner axial portion may extend radially inward at a shallower angle than the outer axial portion. In the illustrated embodiment of FIGS. 3-8, the retaining extension includes an inner axial portion 132 joined with the rear body portion 123 of the front ferrule 120 at the inner hinge portion 131, and extending axially rearward and radially outward from the inner hinge portion, and an outer axial portion 134 joined with the inner axial portion 132 and extending axially rearward and radially inward from the inner axial portion to an end portion 135. In the illustrated embodiment of FIG. 3, the inner and outer axial portions 132, 134 each have a substantially uniform thickness, with respective inner and outer surfaces 132a, 132b, 134a, 134b extending substantially parallel to each other. In other embodiments, the corresponding inner and outer surfaces of either or both of the inner and outer axial portions may be contoured or angled with respect to each other, providing variations in the thickness of either or both axial portions of the extension (for example, to provide focused or increased bending at a desired location on the extension).

The orientation and/or contour of the inner axial portion 132 of the retaining extension 130 may define at least a portion of an interior recess or pocket 137 in which the outer radial portion 144 of the cartridged rear ferrule is retained (FIG. 5). This recess 137 may be appropriately sized to provide a Type 1, 2 or 3 cartridge connection between the front ferrule 120 and the rear ferrule 140, as described in greater detail above.

Additionally or alternatively, the angled orientation of the outer axial portion 134 with respect to the inner axial portion 132 may provide a second, outer hinge portion 133 between the inner axial portion 132 and the outer axial portion 134 of the retaining extension 130. This outer hinge portion 133 may provide a secondary location for radially outward and/or axially rearward flexing during cartridging, for example, to facilitate radial expansion and/or elastic contraction during cartridging. Further, the outer hinge portion 133 may provide for plastic axial compression or collapsing of the retaining extension 130 during further pull-up of the fitting 100, for example, to limit axial advance of the front ferrule 120 during pull-up beyond a position at which the retaining extension engages the rear flange portion 148 of the rear ferrule 140. To facilitate this collapsing of the retaining extension 130, the inner and outer axial portions 132, 134 of the retaining extension may be shaped and/or oriented to form an inverted (but not necessarily symmetrical) "V" in cross section, with the outer hinge portion 133 forming the vertex. In one such embodiment, the inner axial portion 132 of the retaining extension 130 forms an axially rearward facing angle ε, with the central axis X, of between about 60° and about −20°, or between about 500 and about 20°, or about 40°, such that the inner and outer axial portions 132, 134 together form an included angle θ of between about 160° and about 70°, or between about 1300 and about 90°, or about 75°.

Figure 9A:
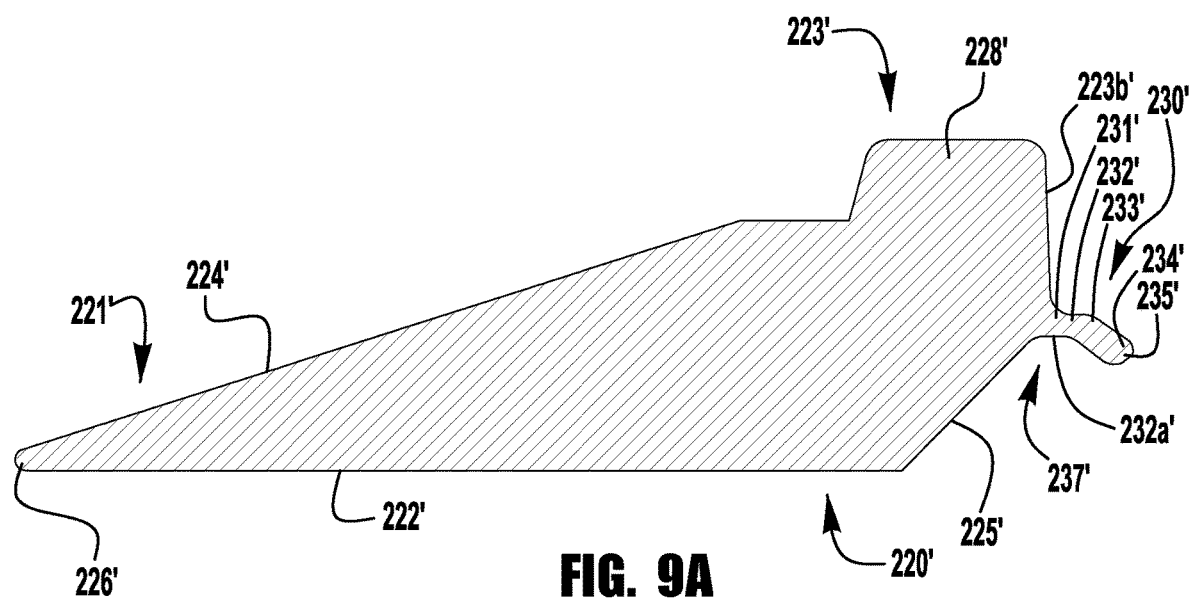
FIG. 9A illustrates a half-longitudinal cross-sectional view of another exemplary front ferrule for use in a cartridged ferrule subassembly, according to another exemplary embodiment of the present application.

FIG. 8 illustrates the conduit fitting 100 in another pulled-up position (e.g., an initial pull-up position or a first or subsequent remake position), in which further axial advance of the rear ferrule 140 with respect to the front ferrule 120 has forced the rear flange portion 148 of the rear ferrule into axial compression against the end portion 135 of the retaining extension 130. This axial compression causes the inner axial portion 132 of the retaining extension to plastically bend radially outward and axially forward toward the front ferrule rear body portion 123, and the outer axial portion 134 of the retaining extension 130 to plastically bend radially inward and axially forward toward the front ferrule rear body portion 132, such that the inner and outer axial portions 132, 134 collapse or fold together. In this collapsed condition, the forward axial movement of the front ferrule imparted by the rear ferrule during pull-up is reduced or minimized. To further facilitate this folding or collapsing action of the retaining extension, the inner hinge portion 131 may be spaced apart from the rear body portion 123 by an axial offset between an inner rear radial surface 123a of the rear body portion 123 (from which the inner hinge portion extends) and an outer rear radial surface 123b (see FIG. 3), with the inner rear radial surface being axially rearward of the outer rear radial surface. As shown, the lengths of the inner and outer axial portions 132, 134 may be selected such that in the collapsed condition, the end portion 135 of the retaining extension 130 does not extend significantly inward of the inner rear radial surface 123a, such that the retaining extension does not become wedged between the interior camming surface 125 and the forward contact surface 142. In other embodiments, for example, as shown on the front ferrule 220 of FIG. 9, the inner hinge portion 231 may be spaced apart from the interior camming surface 225 by an axial offset between an outer rear radial surface 223b and an inner rear radial surface 223a, with the outer rear radial surface being axially rearward of the inner rear radial surface. In still other embodiments, as shown, for example, in FIG. 9A, the inner rear radial surface is omitted, and the camming surface 225' extends, at an oblique angle, to an interior surface 232a' of the extension 230'.

While the retaining extension of any of the embodiments described herein may be configured to minimize any resistance to this folding or collapsing action during pull-up (while maintaining sufficient material strength to maintain cartridged retention of the ferrules), in some embodiments, the properties of the retaining extension (e.g., shape, thickness, material) may be configured to provide a desired amount of resistance to deformation, for example, to provide an indication, through fitting pull-up torque, that the fitting has reached a predetermined pulled-up condition (e.g., initial pull-up, subsequent remake, or a maximum desired number of remakes). This assembly by torque ("ABT") arrangement may allow for a fitting to be assembled or remade to a measured tightening torque condition, as opposed to, for example, pull-up by a prescribed number of turns. This stroke resisting arrangement may be used in combination with other stroke resisting surfaces (e.g., on the fitting body, the fitting nut, or an installed torque collar or other stroke resisting component) to provide for a sufficiently predictable pull-up torque experienced during fitting assembly or remake. Exemplary ABT fitting arrangements are described in, for example, in the above incorporated '110 Application, and in U.S. Pat. Nos. 9,016,732; 9,297,481; and 9,958,097, the entire disclosures of each of which are incorporated herein by reference.

According to another aspect of the present application, a cartridged ferrule subassembly, such as any one or more of the exemplary ferrule subassemblies described herein, may be retained with a fitting component (e.g., one of a fitting body and fitting nut) as a fitting component and ferrule subassembly prior to assembly with a mating fitting component (e.g., the other of the fitting body and fitting nut), for example, for ease of fitting assembly. For example, a fitting nut may be provided with a retaining member (e.g., integral with or assembled with the nut) that engages at least one of the front ferrule and the rear ferrule to retain the ferrule subassembly with the fitting nut as a nut and ferrule subassembly or preassembly prior to assembly of the nut and ferrules with the fitting body. In one such embodiment, the fitting nut includes a retaining member (e.g., flange, tab, ring, adhesive, etc.) that engages a portion of the front ferrule (e.g., an outer radial flange portion at the rear end of the front ferrule). In another exemplary embodiment, the fitting nut includes a retaining member (e.g., flange, tab, ring, adhesive, etc.) that engages a portion of the rear ferrule (e.g., an outer radial flange portion at the rear end of the rear ferrule, a rear driven surface, or an inner radial portion at the rear end of the rear ferrule). Many different ferrule retaining arrangements may be utilized, including, for example, any one or more of the ferrule retaining arrangements described in: U.S. Pat. No. 8,931,810, entitled "Conduit Gripping Device Having Retaining Structure for Conduit Fitting" (the "810 Patent"), US Patent Application Pub. No. 2017/ 0059065, entitled "Component Retaining Structure for Conduit Fitting" (the "'065 Application"), US Patent Application Pub. No. 2017/0227151, entitled "Component Retaining Structure for Conduit Fitting" (the "'151 Application"), US Patent Application Pub. 2017/0261137, entitled "Component Retaining Structure for Conduit Fitting" (the "'137 Application"), and U.S. Provisional Patent Application Ser. No. 62/540,635, filed on Aug. 3, 2017 and entitled "Component Retaining Structure for Conduit Fitting" (the "'635 Application"), the entire disclosures of each of which are incorporated by reference herein.

FIGS. 6, 7, and 8 schematically illustrate a front ferrule retaining member (shown in phantom at 150) which may be positioned, for example, to engage the rear flange portion of the front ferrule 120 to retain the front and rear ferrules 120, 140 with the nut 114 prior to assembly of the nut with a mating fitting body 112. Alternatively, as also shown in FIGS. 6, 7, and 8, a rear ferrule retaining member (shown in phantom at 160) may be provided, positioned to engage the rear flange portion of the rear ferrule 140 to retain the rear ferrules 140 (and with it, the front ferrule 120 of the cartridged subassembly 110) with the nut 114 prior to assembly of the nut with a mating fitting body 112. In some embodiments, the retaining member 150, 160 may be configured to release the ferrules 120, 140 from the nut 114 when the nut is pulled up with the fitting body 112 (e.g., partial pull-up, initial complete pull-up, or subsequent remake). In other embodiments, the retaining member 150, 160 may be configured to permanently secure the ferrules 120, 140 with the nut 114, even after fitting pull-up. In still other embodiments, the retaining member 150, 160 may provide for "soft" or releasable retention of the ferrules 120, 140 with the fitting nut (e.g., through use of a flexible or compressible retaining member, such as an O-ring, gasket, split ring, tabbed ring, or other such flexible expanding or flexing ring, or use of a releasable adhesive), such that the ferrule subassembly 110 may be withdrawn or extracted from the nut 114 by a user (e.g., by insertion of a hook or probe into the nut) prior to fitting assembly (e.g., for inspection or replacement). In some such embodiments, the retaining member 150, 160 may be configured to permit retaining installation of ferrules (either the extracted ferrule subassembly or different, replacement ferrules) by the user. Exemplary retaining members of each of these types are described for example, in the above incorporated '810 Patent, '065 Application, '151 Application, '137 Application, and '635 Application.

Figure 12:
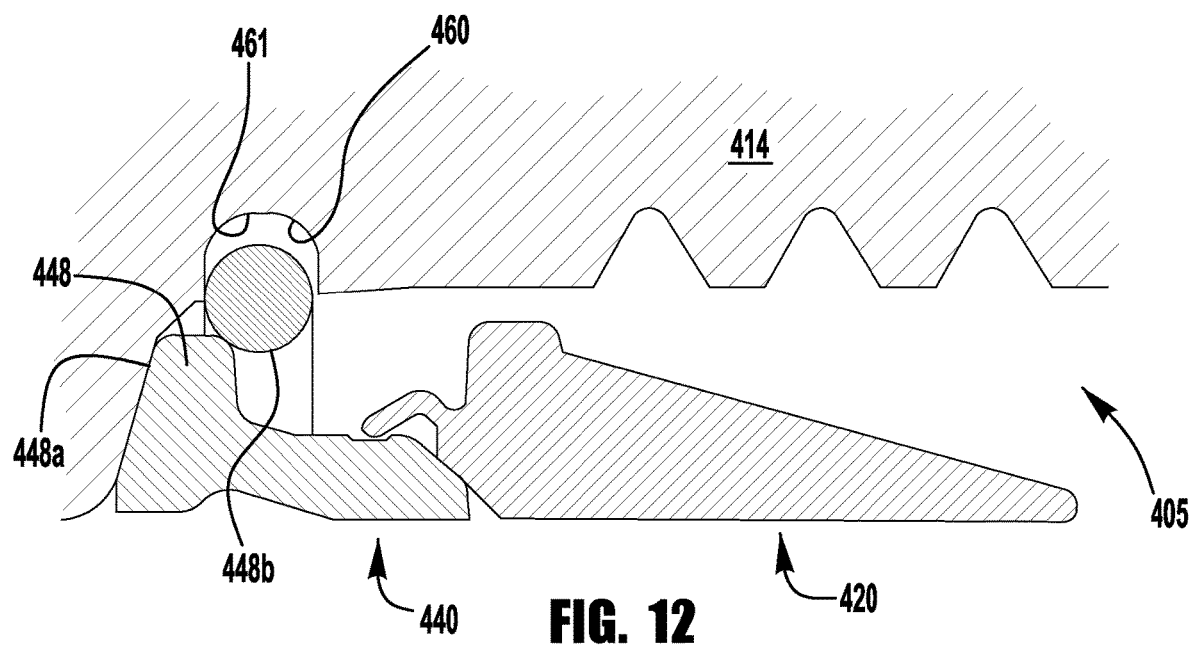
FIG. 12 illustrates a partial cross-sectional view of a front and rear ferrule, shown assembled in a cartridged condition and retained in a fitting nut, according to an exemplary embodiment of the present application.

FIG. 12 illustrates an exemplary nut and ferrule subassembly 405 including a nut 414 having an annular groove 461 that holds a retaining member 460 that extends radially inward for engagement with the rear flange portion 448 of the rear ferrule 440. The retaining member 460 and groove 461 are sized and configured to permit radial expansion of the retaining member further into the groove 461 when the rear surface 448a of the rear ferrule flange 448 is forced against the retaining member 460 during cartridging, to permit axial movement of the rear ferrule flange 448 past the retaining member 460. Upon advancement of the rear ferrule 440 to the cartridged condition, the retaining member 460 contracts or springs back into a ferrule retaining position. Likewise, an axial pulling force applied to the cartridged rear ferrule (e.g., applied by a tool inserted into the nut) causes the front surface 448b of the rear ferrule flange 448 to engage and radially expand the retaining member 460 further into the groove 461 to permit axial movement of the rear ferrule flange 448 past the retaining member 460 for release of the rear ferrule 440. As shown, the front and rear ferrules 420, 440 may be cartridged together for co-retention (and co-release) of the ferrules by the nut 414. The front and rear ferrules 420, 440 may be similar to the front and rear ferrules 120, 140 of the embodiment of FIG. 5. Alternatively, the front and rear ferrules may be similar to any of the other cartridging ferrule embodiments described herein or in the above-incorporated '627 Patent and '110 Application.

While the retaining member 460 is shown as having a circular cross-section, any suitable cross-section may be utilized. The rounded or contoured interior surface or inner diameter ("ID") of the retaining member 460 may facilitate radial expansion of the retaining member during cartridging or withdrawal of the rear ferrule 440.

Figure 12A:
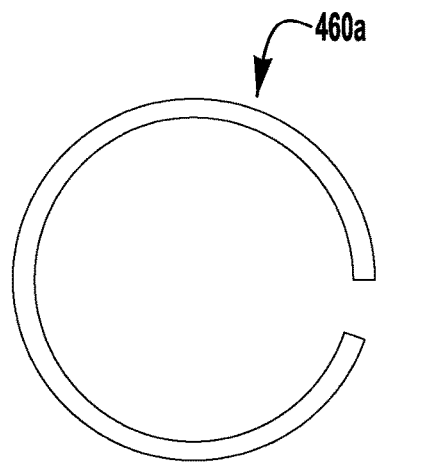
FIG. 12A illustrates an exemplary retaining member for use with the nut and ferrule subassembly of FIG. 12, according to an exemplary embodiment of the present application.
Figure 12B:
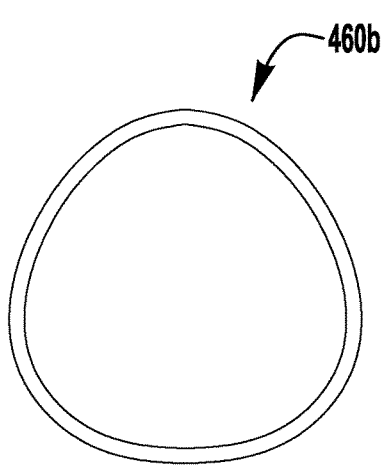
FIG. 12B illustrates an exemplary retaining member for use with the nut and ferrule subassembly of FIG. 12, according to an exemplary embodiment of the present application.

Many different types of radially expanding retaining members 460 may be utilized. FIG. 12A illustrates an exemplary split ring retaining member 460a permitting radial expansion upon axial engagement with an inner diameter ("ID") portion of the split ring 460a. The split in the retaining ring 460a may also facilitate contraction during installation of the retaining ring 460a into the nut groove 461. FIG. 12B illustrates another exemplary retaining ring 460b having a flattened, lobed, or out-of-round condition configured to limit the portions of the ring providing radial interference with the back ferrule flange, such that axial forces applied to the retaining ring by the back ferrule flange are focused on these limited portions to facilitate radial expansion. While the exemplary retaining ring 460b is shown with three uniformly sized and evenly spaced lobes, any sizing, spacing, and number of lobes may be used. Further, while the retaining ring 460b is shown as a continuous (i.e., non-split) ring which radially expands by elastic flexibility of the ring material, the lobed retaining ring may alternatively be provided as a split ring to facilitate radial expansion (during cartridging and ferrule removal) and/or radial contraction (during installation of the retaining ring in the nut).

Figure 13:
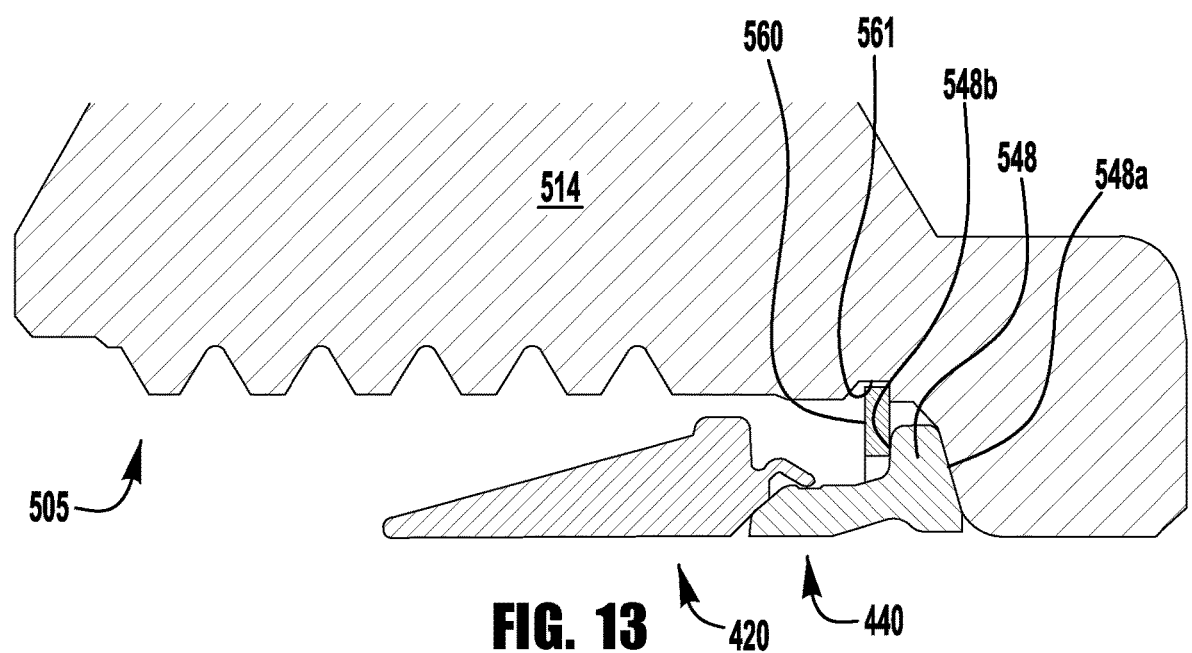
FIG. 13 illustrates a partial cross-sectional view of a front and rear ferrule, shown assembled in a cartridged condition and retained in a fitting nut, according to an exemplary embodiment of the present application.

FIG. 13 illustrates an exemplary nut and ferrule subassembly 505 including a nut 514 having an annular groove 561 that holds a retaining member 560 that extends radially inward for engagement with the rear flange portion 548 of the rear ferrule 540. The retaining member 560 is configured to permit axial elastic bending or flexing of the retaining member when the rear surface 548a of the rear ferrule flange 548 is forced against the retaining member 560 during cartridging, to permit axial movement of the rear ferrule flange 548 past the retaining member 560. Upon advancement of the rear ferrule 540 to the cartridged condition, the retaining member 560 snaps back into a ferrule retaining position. Likewise, an axial pulling force applied to the cartridged rear ferrule (e.g., applied by a tool inserted into the nut) causes the front surface 548b of the rear ferrule flange 548 to engage and bend or flex (in an opposite direction relative to the flexing movement during cartridging) the retaining member 560 to permit axial movement of the rear ferrule flange 548 past the retaining member 560 for release of the rear ferrule 540. As shown, the front and rear ferrules 520, 540 may be cartridged together for co-retention (and co-release) of the ferrules by the nut 514. The front and rear ferrules 520, 540 may be similar to the front and rear ferrules 120, 140 of the embodiment of FIG. 5. Alternatively, the front and rear ferrules may be similar to any of the other cartridging ferrule embodiments described herein or in the above-incorporated '627 Patent and '110 Application.

While the retaining member 560 is shown as having a rectangular cross-section, any suitable cross-section may be utilized. The elongated radial dimension of the retaining member 560 may facilitate axial bending or flexing of the retaining member ID during cartridging or withdrawal of the rear ferrule 540, while maintaining the retaining member 560 in an interlocked or anchored condition within the groove 561.

Figure 13A:
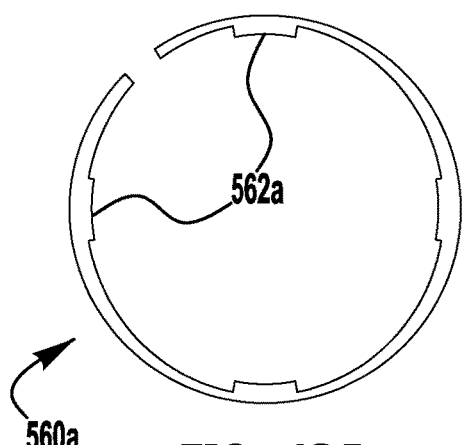
FIG. 13A illustrates an exemplary retaining member for use with the nut and ferrule subassembly of FIG. 13, according to an exemplary embodiment of the present application.
Figure 13B:
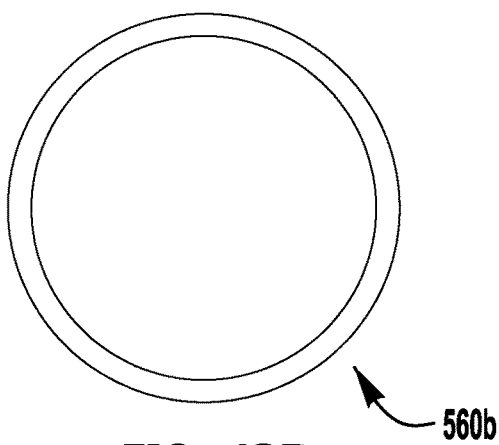
FIG. 13B illustrates an exemplary retaining member for use with the nut and ferrule subassembly of FIG. 13, according to an exemplary embodiment of the present application.

Many different types of radially expanding retaining members 560 may be utilized. FIG. 13A illustrates an exemplary tabbed ring retaining member 560a having inward extending tabs 562a configured to limit the portions of the ring providing radial interference with the rear ferrule flange and facilitating flexing movement of these engaging portions. While the exemplary retaining ring 560a is shown with four uniformly sized and evenly spaced tabs, any sizing, spacing, and number of tabs may be used. As shown, the retaining ring 560a may (but need not) be split, for example, to facilitate contraction during installation of the retaining ring 560a into the nut groove 561. FIG. 13B illustrates an exemplary flexible retaining ring or washer 560b that may be sufficiently flexible across the width (i.e., outer diameter to inner diameter) to permit installation of the retaining ring 560b in the nut groove, and axial flexing movement of the retaining ring ID during cartridging and/or withdrawal of the rear ferrule 540, while maintaining the retaining member 560b in an interlocked or anchored condition within the groove 561. While the retaining ring 560b is shown as a continuous (i.e., non-split) ring which flexes to permit installation in the nut 514, the retaining ring may alternatively be provided as a split ring to facilitate radial contraction (during installation of the retaining ring in the nut). Additionally, the groove 561 may be sized to permit some radial expansion of the retaining ring 560a, 560b during cartridging or withdrawal of the rear ferrule, to further facilitate these operations.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A ferrule subassembly for a conduit fitting, comprising:
    a first ferrule comprising a front body portion defining a forward tapered surface, a rear body portion defining an interior camming surface, and a retaining extension joined with the rear body portion at an inner hinge portion radially outward of the camming surface and extending axially rearward and radially inward from the inner hinge portion; and
    a second ferrule comprising a front portion including a tapered forward contact surface adjacent the first ferrule camming surface and an outer radial portion extending axially rearward of the forward contact surface;
    wherein an end portion of the retaining extension engages the outer radial portion to retain the second ferrule with the first ferrule as a discontinuous subassembly;
    wherein the inner axial portion of the retaining extension extends axially rearward and radially outward from the inner hinge portion to the outer hinge portion, and the outer axial portion of the retaining extension extends axially rearward and radially inward from the outer hinge portion to the end portion, such that the inner and outer axial portions form a V shape in cross-section, and wherein the end portion is received in a recessed portion of the second ferrule to retain the second ferrule with the first ferrule as a discontinuous subassembly
    wherein the retaining extension includes an inner axial portion joined with the rear body portion at the inner hinge portion and extending axially rearward and radially outward from the inner hinge portion, and an outer axial portion joined with the inner axial portion at an outer hinge portion, the outer axial portion extending axially rearward and radially inward from the outer hinge portion to the end portion, such that the inner and outer axial portions form a V shape in cross-section, and wherein the end portion engages the outer radial portion of the second ferrule to retain the second ferrule with the first ferrule as a discontinuous subassembly prior to installation of the ferrule subassembly in the conduit fitting.

2. The ferrule subassembly of claim 1, wherein the outer radial portion of the second ferrule defines a recessed portion, wherein the end portion of the retaining extension is received in the recessed portion to retain the second ferrule with the first ferrule as a discontinuous subassembly.

3. The subassembly of claim 2, wherein the outer radial portion of the second ferrule defines a crown portion axially forward of the recessed portion.

4. The subassembly of claim 3, wherein the crown portion is substantially continuous with the tapered forward contact surface.

5. The subassembly of claim 3, wherein the crown portion is axially offset rearward of the tapered forward contact surface.

6. The subassembly of claim 2, wherein the outer radial portion of the second ferrule comprises a forward cylindrical surface axially forward of the recessed portion.

7. The subassembly of claim 6, wherein the forward cylindrical surface is separated from a rearward cylindrical surface by the recessed portion, the forward and rearward cylindrical surfaces being substantially equal in diameter.

8. The subassembly of claim 1, wherein the rear body portion and the retaining extension together define an interior recess receiving the outer radial portion of the second ferrule.

9. The subassembly of claim 1, wherein the retaining extension is circumferentially continuous.

10. The subassembly of claim 1, wherein the inner hinge portion has a thickness smaller than a thickness of a remainder of the retaining extension.

11. The subassembly of claim 1, wherein the outer axial portion of the retaining extension has a substantially uniform thickness.

12. The subassembly of claim 1, wherein the outer axial portion of the retaining extension extends at an angle of between about 500 and about 20° with respect to a central axis of the first ferrule.

13. The subassembly of claim 1, wherein the inner axial portion of the retaining extension extends axially rearward and radially outward from the rear body portion.

14. The subassembly of claim 13, wherein the inner axial portion of the retaining extension extends at an angle of between about 60° and about −20° with respect to a central axis of the first ferrule.

15. The subassembly of claim 13, wherein the inner axial portion of the retaining extension extends at an angle of between about 160° and about 70° with respect to the outer axial portion of the retaining extension.

16. A ferrule comprising:
   a front body portion defining a forward tapered surface;
   a rear body portion defining an interior camming surface; and
   a retaining extension including an inner axial portion joined with the rear body portion at an inner hinge portion and positioned radially outward of the camming surface and extending axially rearward from the rear body portion, and an outer axial portion joined with the inner axial portion at an outer hinge portion and extending axially rearward and radially inward from the inner axial portion at an angle between about 500 and about 20° with respect to a central axis of the ferrule.

17. The ferrule of claim 16, wherein when the ferrule is axially forced against a second ferrule, such that the end portion of the retaining extension engages a tapered forward contact surface of the second ferrule, the outer axial portion of the retaining extension bends about the outer hinge portion in an axially rearward and radially outward direction and the inner axial portion of the retaining extension bends about the inner hinge portion in an axially rearward and radially outward direction.

18. The ferrule of claim 16, the inner axial portion of the retaining extension extends axially rearward and radially outward from the inner hinge portion to the outer hinge portion, and the outer axial portion of the retaining extension extends axially rearward and radially inward from the outer hinge portion to the end portion, such that the inner and outer axial portions form a V shape in cross-section.

19. A method of cartridging first and second ferrules as a discontinuous preassembly, the method comprising:
   providing a first ferrule having a retaining extension extending axially rearward and radially inward from an inner hinge portion joining the retaining extension to a rear body portion of the first ferrule, wherein the retaining extension includes an inner axial portion joined with the rear body portion at the inner hinge portion and extending axially rearward from the rear body portion, and an outer axial portion joined with the inner axial portion at an outer hinge portion, the outer axial portion extending axially rearward and radially inward from the inner axial portion to an end portion of the retaining extension;
   aligning a second ferrule with the first ferrule along a common central axis;
   axially pressing a tapered forward contact surface of the second ferrule against the end portion of the retaining extension of the first ferrule, such that the outer axial portion of the retaining extension bends about the outer hinge portion in an axially rearward and radially outward direction and the inner axial portion of the retaining extension bends about the inner hinge portion in an axially rearward and radially outward direction to align the end portion of the retaining extension with a recessed portion axially rearward of the outer radial portion;
   wherein the bending of the retaining extension about the outer hinge portion is at least partially elastic, such that when the end portion of the retaining extension is axially aligned with the recessed portion, the end portion snaps into the recessed portion of the second ferrule to secure the second ferrule with the first ferrule as a discontinuous preassembly.

20. The method of claim 19, wherein prior to axially pressing the tapered forward contact surface of the second ferrule against the end portion of the retaining extension of the first ferrule, the inner axial portion of the retaining extension extends axially rearward and radially outward from the inner hinge portion to the outer hinge portion, and the outer axial portion of the retaining extension extends axially rearward and radially inward from the outer hinge portion to the end portion, such that the inner and outer axial portions form a V shape in cross-section.

* * * * *